(12) United States Patent
Merrill, III

(10) Patent No.: US 12,020,076 B2
(45) Date of Patent: Jun. 25, 2024

(54) TECHNIQUES FOR BALANCING WORKLOADS WHEN PARALLELIZING MULTIPLY-ACCUMULATE COMPUTATIONS

(71) Applicant: NVIDIA CORPORATION, Santa Clara, CA (US)

(72) Inventor: Duane George Merrill, III, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 554 days.

(21) Appl. No.: 17/209,061

(22) Filed: Mar. 22, 2021

(65) Prior Publication Data

US 2022/0300326 A1 Sep. 22, 2022

(51) Int. Cl.
*G06F 9/46* (2006.01)
*G06F 7/544* (2006.01)
*G06F 9/50* (2006.01)

(52) U.S. Cl.
CPC ............ *G06F 9/505* (2013.01); *G06F 7/5443* (2013.01)

(58) Field of Classification Search
CPC .............................. G06F 9/505; G06F 7/5443
See application file for complete search history.

*Primary Examiner* — Gregory A Kessler
(74) *Attorney, Agent, or Firm* — Artegis Law Group, LLP

(57) ABSTRACT

In various embodiments, a dispatch application performs multiply-accumulate ("MAC") computations across parallel processing elements. In operation, the dispatch application determines a first quantity of iterations associated with a given MAC computation. The dispatch application determines a maximum number of tasks that can execute concurrently across a set of parallel processing elements. Subsequently, the dispatch application causes the maximum number of tasks to be executed concurrently across the set of parallel processing elements in order to perform the MAC computation. During execution, each task performs a substantially similar number of the first quantity of iterations. Relative to conventional tile-based approaches to performing MAC computations across parallel processing elements, the dispatch application can more evenly distribute iterations across the different parallel processing elements. Accordingly, the dispatch application can reduce the amount of parallel processing element idle time when performing MAC computations.

21 Claims, 8 Drawing Sheets

GEMM Kernel Pseudo Code 610

__global__ GemmKernel(...)            Kernel Declaration 620
{

Initialization Pseudo Code 622
// Initialize cta_itr and determine cta_last_itr based on the CTA
//dentifier, the grid size 452, and the MAC iteration count 456
⋮

```
while (cta_itr < cta_last_itr)                    Iteration-Based
{                                                 Processing Loop
                                                        630
  tile_id       = get_tile_id(itr)
  tile_first_itr = get_tile_itr(tile_id)
  tile_stop_itr = min(cta_last_itr, tile_first_itr + iters_per_tile)
```

```
  accum = gemm_tile(                              Tile-Based
    tile_id,                                      GEMM Loop
    cta_itr - tile_first_itr,                         640
    tile_stop_itr - tile_first_itr);
```

```
  if (!started_tile) {                            Carry-Out
    // Carry-out partial sums                     Pseudo Code
    store_partials(accum);                            650
    signal_done(my_bid);
  } else {
```

```
    if (started_tile && !finished_tile) {         Seam Fixup
      // Carry-in sets of partial sums            Pseudo Code
      last_bid = last_tile_bid(tile_id)               660
      wait_for(my_bid + 1, last_bid)
      accumulate_partials(accum, my_bid, last_bid)
    }
```

```
    // Produce final output tile                  Epilogue Psuedo Code
    eplilogue(accum, tile_id);                         670
  }
}
}
```

FIGURE 6

TECHNIQUES FOR BALANCING WORKLOADS WHEN PARALLELIZING MULTIPLY-ACCUMULATE COMPUTATIONS

BACKGROUND

Field of the Various Embodiments

The various embodiments relate generally to parallel processing systems and, more specifically, to techniques for techniques for balancing workloads when parallelizing multiply-accumulate computations.

DESCRIPTION OF THE RELATED ART

General matrix multiplications ("GEMMs") are used in a wide variety of scientific, engineering, and data applications. For example, GEMMs are fundamental building blocks of many machine learning algorithms, computer graphics algorithms, and computer audio algorithms, to name a few. A GEMM is typically defined as the function $C=\alpha AB+\beta C$, where A is an m*k input matrix, B is a k*n input matrix, $\alpha$ and $\beta$ are scalar value inputs, and C is an m*n output matrix, and where m, n, and k can be any positive integers. Accordingly, a GEMM can be computed by executing m*n*k multiply-accumulate ("MAC") operations. For example, a GEMM where m is 2048, k is 4096, and n is 8192 can be computed by executing roughly 68 billion MAC operations.

Because of the vast number of computations that oftentimes have to be executed for GEMMs, especially those involving larger matrices, GEMMs are frequently computed using sets of instructions or "programs" that execute on multi-core processors. These types of processors can achieve very high computational throughputs by executing large numbers of threads in parallel across many different processing cores. One conventional approach to computing a GEMM on a multi-core processor involves decomposing the output matrix of the GEMM into output tiles based on a tile size defined by the applicable GEMM program. Each output tile is assigned to a different group of threads or "thread group" comprised of one or more threads, and each such thread group is configured to execute the applicable GEMM program using the portions of the input matrices needed to compute the output tile assigned to the thread group. The different thread groups are scheduled to execute on the different processing cores within the multi-core processor based on a maximum "wave size," which specifies the maximum number of thread groups that can execute simultaneously across the different processing cores. In the case where the number of output tiles exceeds the maximum wave size, the thread groups are scheduled to execute over multiple sequential waves. For example, if an output matrix were to include eight output tiles, and the maximum wave size were set to four, then four thread groups would be scheduled to execute in a first wave, and four thread groups would be scheduled to execute in a second wave. Once the last thread group in the last wave finishes executing the applicable GEMM program, the GEMM is considered complete.

One drawback of the above approach is that a multi-core processor can be underutilized when computing a GEMM if the number of output tiles is not an integer multiple of the maximum wave size. For example, if the output matrix were to include nine output tiles, and the maximum wave size were set to four, then four thread groups would be scheduled to execute in a first wave, four thread groups would be scheduled to execute in a second wave, and one thread group would be scheduled to execute in a third wave. Because the third wave would end up being only partially filled, three of the four processor cores would sit idle while the one thread group executing the applicable GEMM program during the third wave computed the last output tile. In this example, the utilization rate of the multi-core processor while executing the GEMM would be 75% (9 tiles/(4 processor cores*3 waves)). Underutilizing a multi-core processor wastes processing resources and can degrade the computational throughput of the multi-core processor and cause latencies.

To reduce the negative impacts resulting from partially filled waves, attempts have been made to generate different GEMM programs for different tile sizes and enhance existing program-selection heuristics to select a single tile size for each GEMM. One drawback of this approach is that, for each tile size, the GEMM programs for a given multi-core architecture can include tens or even hundreds of different programs that each correspond to a different combination of GEMM characteristics, such as, without limitation, the type and layout of each of the relevant matrices. For example, for 50 different tile sizes, the number of GEMM programs could grow to 5,000 different programs. The aggregate amount of resources required to generate, store, and transmit all of the different GEMM programs similarly increases as the number of tile sizes increases. Further, taking into account the negative impacts of unevenly distributing GEMM computations across the different processor cores of a multi-core processor when evaluating tradeoffs between tile size and overall processing performance can be quite complicated. Consequently, using enhanced program-selection heuristics can easily result in a suboptimal tile size and a corresponding suboptimal GEMM program being selected.

More generally, drawbacks similar to those described above can arise with tile-based approaches for executing other types of GEMM-like computations or "MAC computations" across multiple different processing elements simultaneously. For example, if the size of output tiles included in a output tensor of a tensor product is not an integer multiple of the maximum number of tasks that can execute across parallel computer nodes included in a distributed computer system, then the distributed computer system can be underutilized when computing the tensor product.

As the foregoing illustrates, what is needed in the art are more effective techniques for performing MAC computations, such as GEMMs, on computing systems that include multiple parallel processing elements.

SUMMARY

One embodiment of the present invention sets forth a computer-implemented method for performing multiply-accumulate ("MAC") computations. The method includes determining a first quantity of iterations associated with a first MAC computation; determining a maximum number of tasks that can execute concurrently across a set of parallel processing elements; and causing the maximum number of tasks to be executed concurrently across the plurality of parallel processing elements in order to perform the first MAC computation, where, during execution, each task performs a substantially similar number of the first quantity of iterations.

At least one technical advantage of the disclosed techniques relative to the prior art is that, with the disclosed techniques, the utilization rates of a computing system including multiple parallel processing elements can be increased when performing MAC computations. In that regard, with the disclosed techniques, the variation between the number of iterations executed by each parallel processing element when performing a MAC computation is limited to about one, and the time required to perform a given iteration can be substantially less than the time required to compute an given output tile using prior art approaches. Accordingly, the disclosed techniques can reduce the amount of parallel processing element idle time when performing MAC computations and increase computational throughput as well. In addition, in the context of multi-core processors, for each combination of MAC computation characteristics, a single MAC computation program can be implemented to more evenly distribute iterations across the different processing cores within a multi-core processor, irrespective of the tile size. Thus, the total number of MAC computation programs and the aggregate amount of resources required to generate, store, and transmit those programs can be reduced relative to prior art approaches. Further, because each MAC computation program can implement a tile size that is optimized for a given multi-core processor without negatively impacting the distribution of MAC computations across the processing cores, degradations in the computational throughput and latencies resulting from suboptimal tile size selection can be reduced. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 6 is an exemplar illustration of GEMM kernel pseudo code for the GEMM kernel of FIG. 4, according to various embodiments;

DETAILED DESCRIPTION

Figure 1:
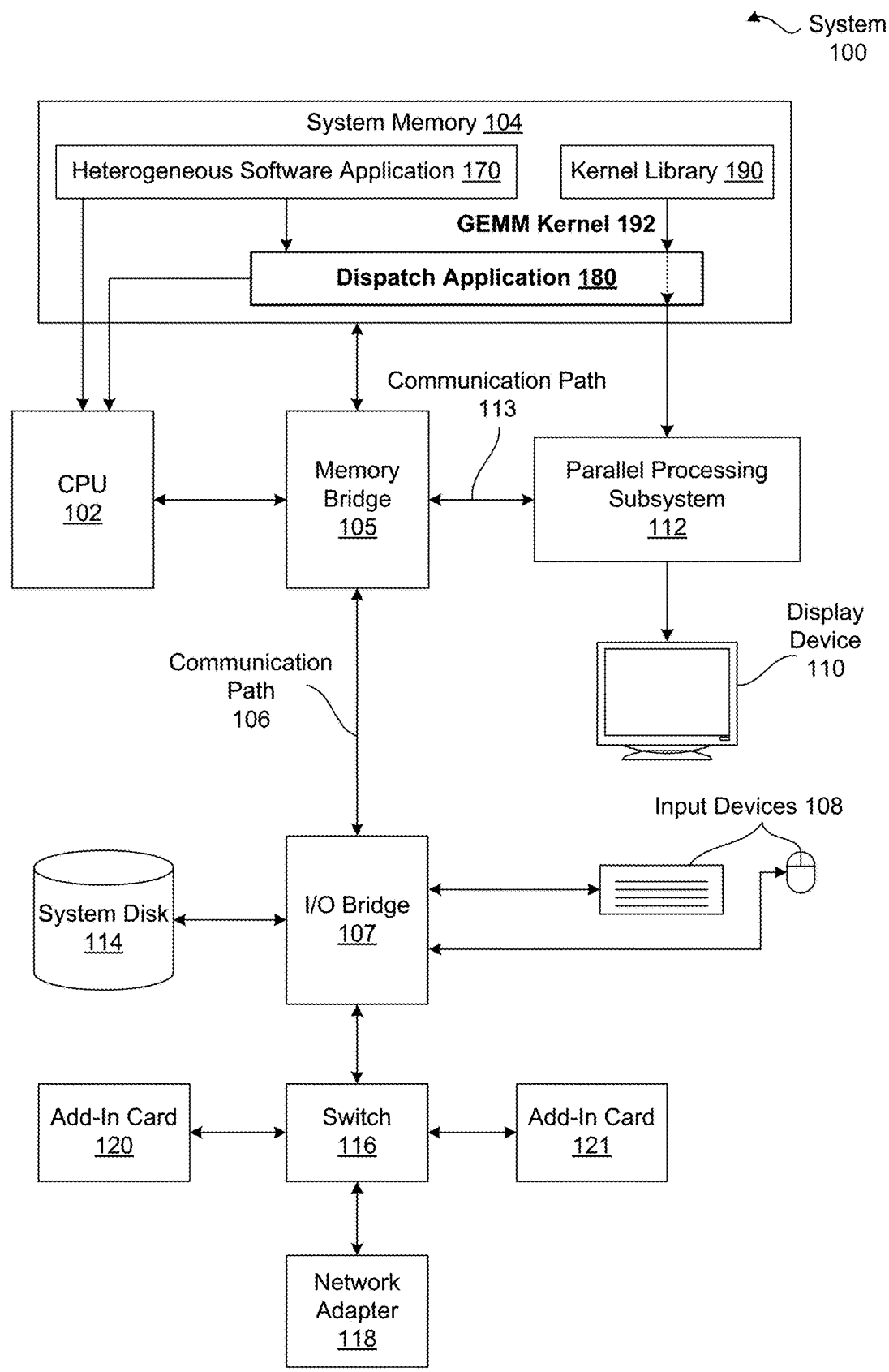
FIG. 1 is a block diagram illustrating a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As described previously herein, one conventional approach to computing a GEMM on a multi-core processor involves decomposing the output matrix of the GEMM into output tiles based on a tile size defined by an applicable GEMM program. Each output tile is assigned to a different thread group comprised of one or more threads and each thread group is configured to execute the applicable GEMM program using the portions of the input matrices needed to compute the output tile assigned to the thread group. One drawback of the above approach is that if the number of output tiles is not an integer multiple of the maximum wave size, then one of the wave(s) of thread groups executing the GEMM is only partially filled. Partially filled waves correspond to an underutilization of the multi-core processor.

To reduce the negative impacts resulting from partially filled waves, attempts have been made to generate different GEMM programs for different tile sizes and enhance existing program-selection heuristics to select a single tile size for each GEMM. One drawback of this approach is that, the aggregate amount of resources required to generate, store, and transmit GEMM programs for different combinations of GEMM characteristics can be increased by a factor of the tile size. Further, empirical results have shown that enhanced program-selection heuristics can easily select a suboptimal tile size and a corresponding suboptimal GEMM program.

Dividing MAC Iterations Equitably Across the Processor Cores

To address these issues, in some embodiments, an iteration-based parallel decomposition strategy is implemented in a multi-core processor to divide a total number of MAC iterations required to perform a given GEMM equitably across the processor cores. A GEMM is also referred to herein as a "GEMM computation" and a "GEMM operation." For explanatory purposes only, "equitably" as used herein refers to as close to evenly as possibly. Furthermore, as used herein, "equitably" is the same as "substantially similar." In some embodiments, the total number of MAC iterations executed by each of the processor cores varies by at most one. More specifically, in some embodiments, each of the processor cores executes either x or (x+1) MAC iterations, where x can be any positive integer.

As referred to herein a "MAC iteration" is a fixed amount of parallel processing element progress (as measured in logical MAC operations) in the accumulation dimension (e.g., the k-axis) that is not further subdivided across parallel processing elements. A MAC iteration is also referred to herein as "an iteration" that is associated with a given MAC computation (e.g., a GEMM). In some embodiments, the parallel processing elements are the processor cores included in a multi-core processor. And, for a given MAC computation, each MAC iteration is associated with a substantially similar amount of progress a given parallel processing element advances in a given accumulation dimension.

In some embodiments, a MAC iteration is a single logical MAC operation computed via a "single MAC" processor instruction. In some other embodiments, a MAC iteration is a fixed number of logical MAC operations computed via a single "bulk MAC" processor instruction. In yet other embodiments, a MAC iteration is a fixed number of logical MAC operations computed via a static unrolling of single MAC processor instructions, bulk MAC processor operations, or any combination thereof.

Advantageously, the total number of MAC operations included in each MAC iteration can be selected to be considerably lower than the total number of MAC operations required to compute each output tile. For a given GEMM, any system-wide underutilization attributable to the quantization of MAC iterations across processor cores can therefore be significantly reduced relative to any system-wide underutilization attributable to the quantization of output tiles across the processor cores. In some embodiments, any system-wide utilization is a negligible percentage of the total execution time for the GEMM.

For explanatory purposes only, some embodiments in which the iteration-based parallel decomposition strategy is implemented to compute GEMMs in an exemplar multi-core processor are described in conjunction with FIGS. 1-6. In the exemplar multi-core processor, a virtualized parallel runtime dispatches thread groups across physical processor cores. In a complementary fashion, a flow for performing a GEMM on a multi-core processor via a virtualized parallel runtime is described in conjunction with FIG. 7.

More generally, the iteration-based parallel decomposition strategy described in conjunction with FIGS. 1-7 can be implemented in any type of computing system that includes without limitation, multiple parallel processing elements to perform any number and/or types of MAC computations. As referred to herein, a "parallel processing element" of a computing system is a physical unit of simultaneous execution in the computing system. For instance, in the embodiments described in FIGS. 1-7, the computing system is a multi-core processor and the parallel processing elements are processor cores.

As referred to herein, a MAC computation includes, without limitation, multiple MAC operations. Some examples of MAC computations include, without limitation, matrix product operations, convolution operations, tensor product operations, and tensor contraction operations. Accordingly, the output of a given MAC computation can be a matrix, a tensor, etc. The MAC operations included in a given MAC computation can be associated with any algebraic semiring. Some examples of algebraic semirings include, without limitation, a plus-multiply semiring, a min-plus semiring, a max-plus semiring, a min-multiply semiring, a max-multiply semiring, a min-max semiring, a mx-min semiring, and an or-and semiring. In particular a GEMM is a MAC computation that includes, without limitation, multiple MAC operations that are associated with a plus-multiply semiring.

Figure 7:
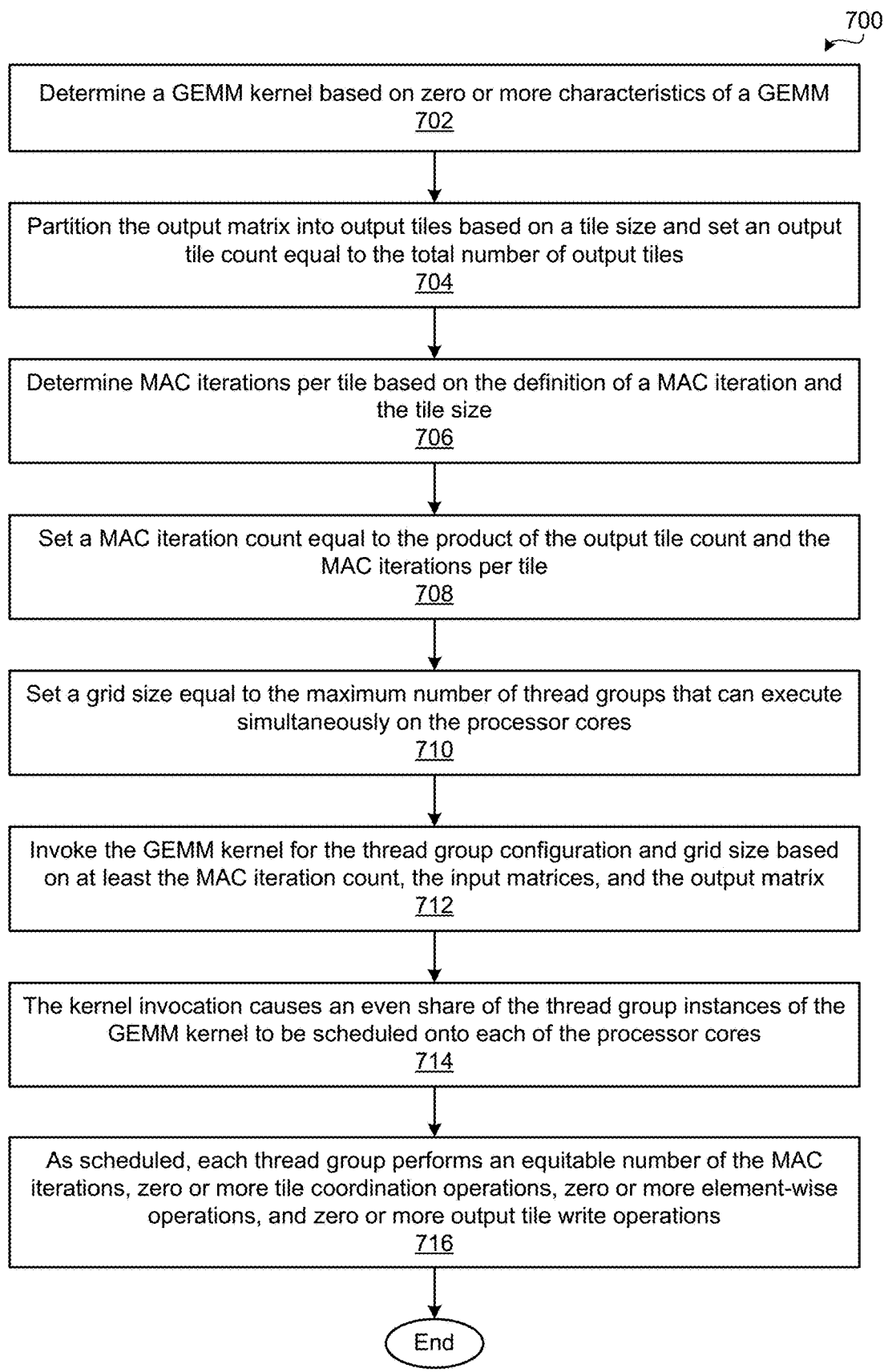
FIG. 7 is a flow diagram of method steps for computing a GEMM on a multi-core processor, according to various embodiments.

After the detailed description of FIG. 7, the iteration-based parallel decomposition strategy is described in the context of performing any type of MAC computation across any multiple parallel processing elements included in any type of computing system. In a complementary fashion, a flow for performing a MAC computation on a computing system that includes multiple parallel processing elements is described in conjunction with FIG. 8.

System Overview

FIG. 1 is a block diagram illustrating a system 100 configured to implement one or more aspects of the various embodiments. As shown, the system 100 includes, without limitation, a central processing unit ("CPU") 102 and a system memory 104 coupled to a parallel processing subsystem 112 via a memory bridge 105 and a communication path 113. The memory bridge 105 is further coupled to an input/output ("I/O") bridge 107 via a communication path 106, and the I/O bridge 107 is, in turn, coupled to a switch 116.

In operation, the I/O bridge 107 is configured to receive user input information from input devices 108, such as a keyboard or a mouse, and forward the input information to the CPU 102 for processing via the communication path 106 and the memory bridge 105. The switch 116 is configured to provide connections between the I/O bridge 107 and other components of the system 100, such as a network adapter 118 and add-in cards 120 and 121.

As also shown, the I/O bridge 107 is coupled to a system disk 114 that can be configured to store content and applications and data for use by the CPU 102 and the parallel processing subsystem 112. As a general matter, the system disk 114 provides non-volatile storage for applications and data and can include fixed or removable hard disk drives, flash memory devices, compact disc read-only-memory, digital versatile disc read-only-memory, Blu-ray, high definition digital versatile disc, or other magnetic, optical, or solid state storage devices. Finally, although not explicitly shown, other components, such as universal serial bus or other port connections, compact disc drives, digital versatile disc drives, film recording devices, and the like, can be connected to the I/O bridge 107 as well.

In various embodiments, the memory bridge 105 can be a Northbridge chip, and the I/O bridge 107 can be a Southbridge chip. In addition, the communication paths 106 and 113, as well as other communication paths within the system 100, can be implemented using any technically suitable protocols, including, without limitation, Peripheral Component Interconnect Express, Accelerated Graphics Port, HyperTransport, or any other bus or point-to-point communication protocol known in the art.

In some embodiments, the parallel processing subsystem 112 includes, without limitation, one or more multi-core processors. The multi-core processors are also referred to herein individually as a parallel processing unit ("PPU") and collectively as PPUs. In the same or other embodiments, each PPU includes, without limitation, multiple processor cores. The processor cores are also referred to herein individually as a streaming multiprocessor ("SM") and collectively as SMs. In some embodiments, the PPUs can be identical or different, and each PPU can have dedicated parallel processing memory or no dedicated parallel processing memory. Any number of PPUs can output data to any number of display devices 110.

In some embodiments, the parallel processing subsystem 112 incorporates circuitry optimized for general purpose processing. As described in greater detail below in conjunction with FIG. 2, such circuitry can be incorporated across one or more PPUs that can be configured to perform general purpose processing operations. In the same or other embodiments, the parallel processing subsystem 112 further incorporates circuitry optimized for graphics processing. Such circuitry can be incorporated across one or more PPUs that can be configured to perform graphics processing operations. In some embodiments, zero or more of the PPUs can be configured to perform general purpose processing operations but not graphics processing operations, zero or more of the PPUs can be configured to perform graphics processing operations but not general purpose processing operations, and zero or more of the PPUs can be configured to perform general purpose processing operations and/or graphics processing operations.

In some embodiments, the parallel processing subsystem 112 can be integrated with one or more other the other elements of FIG. 1 to form a single system. For example, the parallel processing subsystem 112 can be integrated with the CPU 102 and other connection circuitry on a single chip to form a system on a chip ("SoC"). In the same or other embodiments, any number of CPUs 102 and any number of parallel processing subsystems 112 can be distributed across any number of shared geographic locations and/or any number of different geographic locations and/or implemented in one or more cloud computing environments (i.e., encapsulated shared resources, software, data, etc.) in any combination.

The system memory 104 can include, without limitation, any number and/or types of device drivers (not shown), any number and/or types of runtimes (not shown), any number and/or types of software applications, or any combination thereof. In some embodiments, at least one device driver is configured to manage the processing operations of the one or more PPUs within the parallel processing subsystem 112. In the same or other embodiments, any number of device drivers implement application programming interface ("API") functionality that enables software applications to specify instructions for execution on the one or more PPUs via API calls. In some embodiments, any number of device drivers provide compilation functionality for generating machine code specifically optimized for the parallel processing subsystem 112. In the same or other embodiments, a virtualized parallel runtime enables software applications to dispatch thread groups across one or more SMs.

Each of the software applications can reside in any number of memories and execute on any number of processors in any combination. As referred to herein, a "processor" can be any instruction execution system, apparatus, or device capable of executing instructions. Some examples of processors include, without limitation, the CPU 102, the parallel processing subsystem 112, and the PPUs.

As shown, in some embodiments, the system memory 104 includes, without limitation, a heterogeneous software application 170, a dispatch application 180, a kernel library 190, and a GEMM kernel 192. The heterogeneous software application 170 is a software application that executes any number and/or types of instructions on the CPU 102 and any number and/or types of instructions on the parallel processing subsystem 112. The heterogeneous software application 170 can execute any number and/or types of instructions on the parallel processing subsystem 112 in any technically feasible fashion.

For instance, in some embodiments the heterogeneous software application 170 calls any number and/or types of functions included in the dispatch application 180 to compute a GEMM (not shown) on the parallel processing subsystem 112. The terms "function" and "program" are both used herein to refer to any set of one or more instructions that can be executed by any number and/or types of processors. Furthermore, the term "kernel" is used to refer to a set of instructions (e.g., a program, a function, etc.) that can execute on one or more computing systems that each include, without limitation, multiple parallel processing elements.

As described in greater detail below in conjunction with FIG. 4, in some embodiments, the dispatch application 180 can execute GEMMs and/or any number (including zero) of other MAC computations on the parallel processing subsystem 112 in response to function calls from software applications (e.g., the heterogeneous software application 170) using the kernel library 190. The kernel library 190 includes, without limitation, any number and/or types of kernels, where each kernel is a set of instructions that can execute on the parallel processing subsystem 112.

In some embodiments, the kernel library 190 includes, without limitation, a GEMM kernel 192 that can be used to efficiently compute GEMMs on the SMs. In some other embodiments, the kernel library 190 can include, without limitation, any number of GEMM kernels 192, where each GEMM kernel 192 is specialized for a different combination of GEMM characteristics. Some examples of GEMM characteristics include, without limitation, the types of each of the input matrices and the output matrix. For instance, in some embodiments, the kernel library 190 includes, without limitation, any number and/or types of GEMM kernels 192 that collectively support mixed-precision computations and provide specialized data-movement and MAC abstractions for handling 8-bit integer types, half-precision floating point types, single-precision floating point types, and double-precision floating point types.

The dispatch application 180 and/or the GEMM kernel 192 can implement any number and/or types of techniques to efficiently compute GEMMs on the SMs. In some embodiments, the dispatch application 180 and the GEMM kernel 192 include, without limitation, functionality that implements the iteration-based parallel decomposition strategy described previously herein in the PPUs. More specifically, the dispatch application 180 and the GEMM kernel 192 can be used to divide a total number of MAC iterations required to perform a given GEMM equitably across the SMs in a given PPU.

In the same and/or other embodiments, the dispatch application 180 and/or the GEMM kernel 192 implement, without limitation, any number and/or types of blocking strategies and/or any number and/or types of tiling strategies designed to increase data sharing and reuse. For instance, in some embodiments, the dispatch application 180 and/or the GEMM kernel 192 performs any number of blocking operations and/or any number of tiling operations to match memory locality.

Note that the techniques described herein are illustrative rather than restrictive and may be altered without departing from the broader spirit and scope of the invention. Many modifications and variations on the functionality provided by the heterogeneous software application 170, the dispatch application 180, the kernel library 190, the GEMM kernel 192, drivers, and runtimes the virtualized parallel runtime) will be apparent to those of ordinary skill in the art without departing from the scope and spirit of the described embodiments.

For instance, in some embodiments, the kernel library 190 includes, without limitation, any number and/or types of MAC computation kernels (e.g., one or more GEMM kernels 192, one or more tensor contraction kernels, etc.). Each MAC computation kernel can be used to efficiently perform associated MAC computations on the SMs. In the same or other embodiments, the dispatch application 180 and/or the MAC computation kernels can implement any number and/or or types of techniques to efficiently perform MAC computations on the SMs.

It will be appreciated that the system shown herein is illustrative and that variations and modifications are possible. The connection topology, including the number and arrangement of bridges, the number of the CPUs 102, and the number of the parallel processing subsystems 112, can be modified as desired. For example, in some embodiments, the system memory 104 can be connected to the CPU 102 directly rather than through the memory bridge 105, and other devices can communicate with the system memory 104 via the memory bridge 105 and the CPU 102. In other alternative topologies, the parallel processing subsystem 112 can be connected to the I/O bridge 107 or directly to the CPU 102, rather than to the memory bridge 105. In still other embodiments, the I/O bridge 107 and the memory bridge 105 can be integrated into a single chip instead of existing as one or more discrete devices. Lastly, in certain embodiments, one or more components shown in FIG. 1 may not be present. For example, the switch 116 could be eliminated, and the network adapter 118 and the add-in cards 120, 121 would connect directly to the I/O bridge 107.

Figure 2:
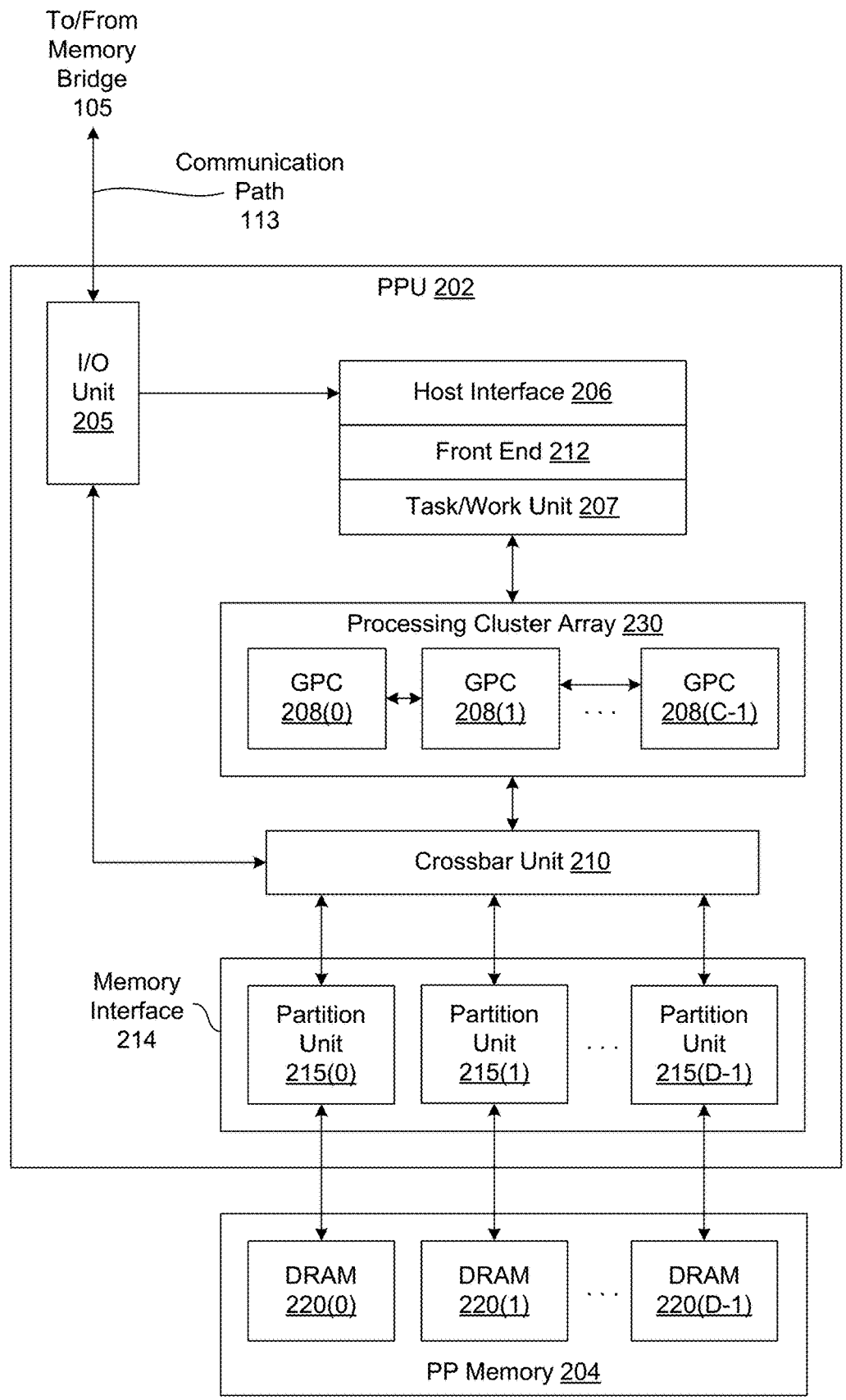
FIG. 2 is a block diagram of a parallel processing unit included in the parallel processing subsystem of FIG. 1, according to various embodiments.

FIG. 2 is a block diagram of a PPU 202 included in the parallel processing subsystem 112 of FIG. 1, according to various embodiments. Although FIG. 2 depicts one PPU 202, as indicated above, the parallel processing subsystem 112 can include zero or more other PPUs that are identical to the PPUs 202 and zero or more other PPUs that are different from the PPU 202. As shown, the PPU 202 is coupled to a local parallel processing ("PP") memory 204. The PPU 202 and the PP memory 204 can be implemented using one or more integrated circuit devices, such as programmable processors, application specific integrated circuits, or memory devices, or in any other technically feasible fashion.

As shown, the PPU 202 incorporates circuitry optimized for general purpose processing, and the PPU 202 can be configured to perform general purpose processing operations. Although not shown in FIG. 2, in some embodiments, the PPU 202 further incorporates circuitry optimized for graphics processing, including, for example, video output circuitry. In such embodiments, the PPU 202 can be configured to perform general purpose processing operations and/or graphics processing operations.

Referring again to FIG. 1 as well as FIG. 2, in some embodiments, the CPU 102 is the master processor of the system 100, controlling and coordinating operations of other system components. In particular, the CPU 102 issues commands that control the operation of the PPU 202. In some embodiments, the CPU 102 writes a stream of commands for the PPU 202 to a data structure (not explicitly shown in either FIG. 1 or FIG. 2) that can be located in the system memory 104, the PP memory 204, or another storage location accessible to both the CPU 102 and the PPU 202. A pointer to the data structure is written to a pushbuffer to initiate processing of the stream of commands in the data structure. The PPU 202 reads command streams from the pushbuffer and then executes commands asynchronously relative to the operation of the CPU 102. In embodiments where multiple pushbuffers are generated, execution priorities can be specified for each pushbuffer by an application program via a device driver (not shown) to control scheduling of the different pushbuffers.

Referring back now to FIG. 2 as well as FIG. 1, in some embodiments, the PPU 202 includes an I/O unit 205 that communicates with the rest of system 100 via the communication path 113, which connects to memory bridge 105. In some other embodiments, the I/O unit 205 communicates with the rest of system 100 via the communication path 113, which connects directly to CPU 102. In the same or other embodiments, the connection of the PPU 202 to the rest of the system 100 can be varied. In some embodiments, the parallel processing subsystem 112, which includes at least one PPU 202, is implemented as an add-in card that can be inserted into an expansion slot of the system 100. In some other embodiments, the PPU 202 can be integrated on a single chip with a bus bridge, such as the memory bridge 105 or the I/O bridge 107. In some other embodiments, some or all of the elements of the PPU 202 can be included along with the CPU 102 in a single integrated circuit or system on a chip.

The I/O unit 205 generates packets (or other signals) for transmission on the communication path 113 and also receives all incoming packets (or other signals) from the communication path 113, directing the incoming packets to appropriate components of the PPU 202. For example, commands related to processing tasks can be directed to a host interface 206, while commands related to memory operations (e.g., reading from or writing to the PP memory 204) can be directed to a crossbar unit 210. The host interface 206 reads each pushbuffer and transmits the command stream stored in the pushbuffer to a front end 212.

In operation, the front end 212 transmits processing tasks received from the host interface 206 to a work distribution unit (not shown) within a task/work unit 207. The work distribution unit receives pointers to processing tasks that are encoded as task metadata ("TMD") and stored in memory. The pointers to TMDs are included in a command stream that is stored as a pushbuffer and received by the front end 212 from the host interface 206. Processing tasks that can be encoded as TMDs include indices associated with the data to be processed as well as state parameters and commands that define how the data is to be processed. For example, the state parameters and commands could define the program to be executed on the data.

The PPU 202 advantageously implements a highly parallel processing architecture based on a processing cluster array 230 that includes a set of C GPCs 208, where C 1. Each of the GPCs 208 is capable of executing a large number (e.g., hundreds or thousands) of threads concurrently, where each thread is an instance of a program (e.g., a kernel). In various applications, different GPCs 208 can be allocated for processing different types of programs or for performing different types of computations. The allocation of the GPCs 208 can vary depending on the workload arising for each type of program or computation. The GPCs 208 receive processing tasks to be executed from the work distribution unit within the task/work unit 207.

The task/work unit 207 receives processing tasks from the front end 212 and ensures that general processing clusters ("GPCs") 208 are configured to a valid state before the processing task specified by each one of the TMDs is initiated. A priority can be specified for each TMD that is used to schedule the execution of the processing task. Processing tasks also can be received from the processing cluster array 230. Optionally, the TMD can include a parameter that controls whether the TMD is added to the head or the tail of a list of processing tasks (or to a list of pointers to the processing tasks), thereby providing another level of control over execution priority.

Memory interface 214 includes a set of D partition units 215, where D 1. Each of the partition units 215 is coupled to one or more dynamic random access memories ("DRAMs") 220 residing within the PP memory 204. In some embodiments, the number of the partition units 215 equals the number of the DRAMs 220, and each of the partition units 215 is coupled to a different one of the DRAMs 220. In some other embodiments, the number of the partition units 215 can be different than the number of the DRAMs 220. Persons of ordinary skill in the art will appreciate that the DRAM 220 can be replaced with any other technically suitable storage device. In operation, various targets can be stored across the DRAMs 220, allowing the partition units 215 to write portions of each target in parallel to efficiently use the available bandwidth of the PP memory 204.

A given GPC 208 can process data to be written to any of the DRAMs 220 within the PP memory 204. The crossbar unit 210 is configured to route the output of each GPC 208 to the input of any partition unit 215 or to any other GPC 208 for further processing. The GPCs 208 communicate with the memory interface 214 via the crossbar unit 210 to read from or write to any number of the DRAMs 220. In some embodiments, the crossbar unit 210 has a connection to the I/O unit 205 in addition to a connection to the PP memory 204 via the memory interface 214, thereby enabling the SMs within the different GPCs 208 to communicate with the system memory 104 or other memory not local to the PPU 202. In the embodiment of FIG. 2, the crossbar unit 210 is directly connected with the I/O unit 205. In various embodiments, the crossbar unit 210 can use virtual channels to separate traffic streams between the GPCs 208 and the partition units 215.

Again, the GPCs 208 can be programmed to execute processing tasks relating to a wide variety of applications and/or algorithms. In some embodiments, the PPU 202 is configured to transfer data from the system memory 104 and/or the PP memory 204 to one or more on-chip memory units, process the data, and write result data back to the system memory 104 and/or the PP memory 204. The result data can then be accessed by other system components, including the CPU 102, another PPU 202 within the parallel processing subsystem 112, or another parallel processing subsystem 112 within the system 100.

As noted above, any number of the PPUs 202 can be included in the parallel processing subsystem 112. For example, multiple PPUs 202 can be provided on a single add-in card, or multiple add-in cards can be connected to the communication path 113, or one or more of the PPUs 202 can be integrated into a bridge chip. The PPUs 202 in a multi-PPU system can be identical to or different from one another. For example, different PPUs 202 might have different numbers of processor cores and/or different amounts of the PP memory 204. In implementations where multiple PPUs 202 are present, those PPUs 202 can be operated in parallel to process data at a higher throughput than is possible with a single PPU 202. Systems incorporating one or more PPUs 202 can be implemented in a variety of configurations and form factors, including, without limitation, desktops, laptops, handheld personal computers or other handheld devices, servers, workstations, game consoles, embedded systems, and the like.

Figure 3:
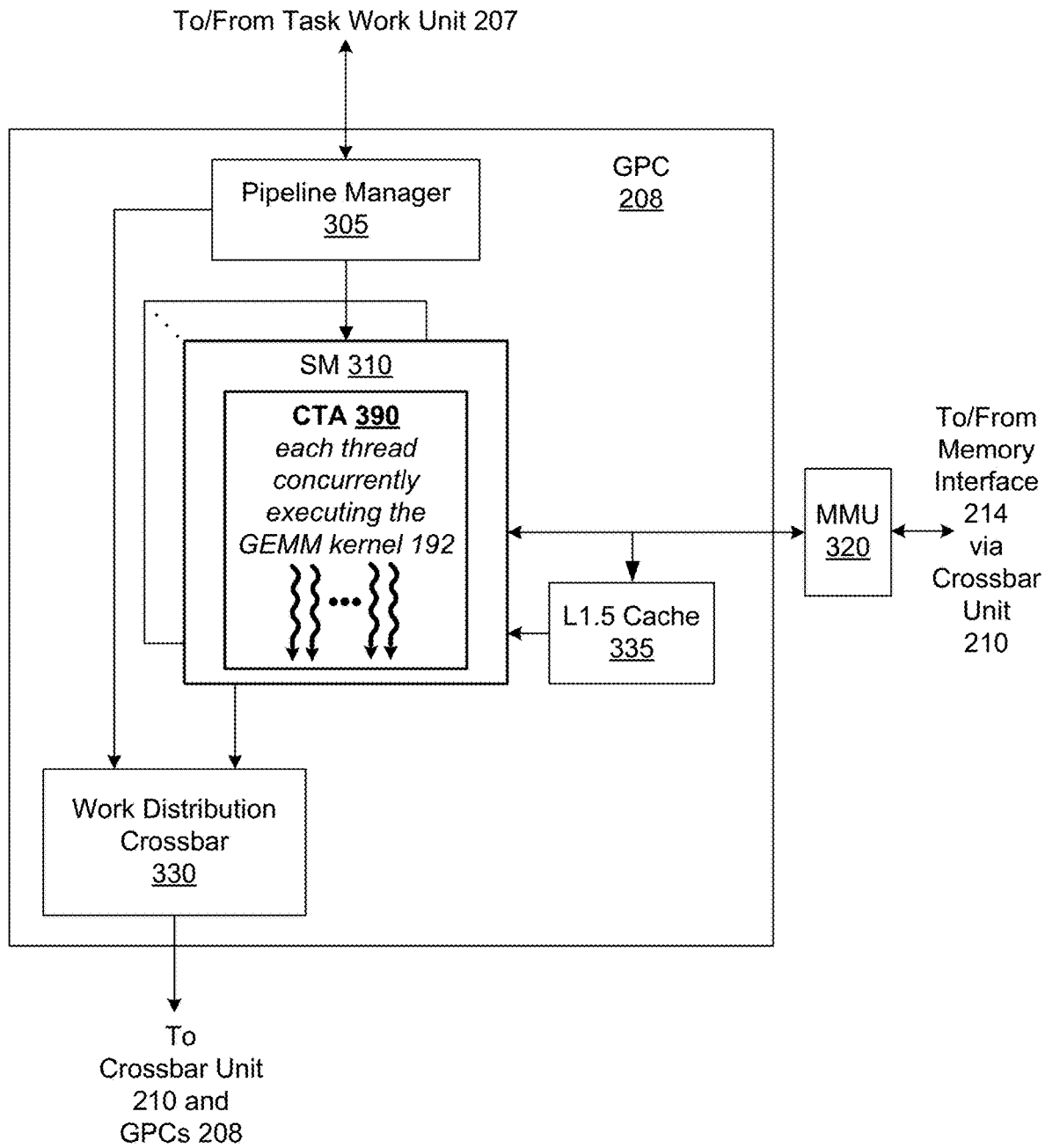
FIG. 3 is a block diagram of a general processing cluster included in the parallel processing unit of FIG. 2, according to various embodiments.

FIG. 3 is a block diagram of a GPC 208 included in the PPU 202 of FIG. 2, according to various embodiments. In operation, the GPC 208 can be configured to execute a large number of threads in parallel. In some embodiments, each thread executing on the GPC 208 is an instance of a particular program executing on a particular set of input data. In some embodiments, single-instruction, multiple-data ("SIMD") instruction issue techniques are used to support parallel execution of a large number of threads without providing multiple independent instruction units. In some other embodiments, single-instruction, multiple-thread ("SIMT") techniques are used to support parallel execution of a large number of generally synchronized threads, using a common instruction unit configured to issue instructions to a set of processing engines within the GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of the GPC 208 is controlled via a pipeline manager 305 that distributes processing tasks received from the work distribution unit (not shown) within the task/work unit 207 to one or more SMs 310. The pipeline manager 305 can also be configured to control a work distribution crossbar 330 by specifying destinations for processed data output by the SMs 310.

In some embodiments, the GPC 208 includes, without limitation, a number M of SMs 310, where M 1. In the same or other embodiments, each of the SMs 310 includes, without limitation, a set of functional units (not shown), such as execution units and load-store units. Processing operations specific to any of the functional units can be pipelined, which enables a new instruction to be issued for execution before a previous instruction has completed execution. Any combination of functional units within a given SM 310 can be provided. In various embodiments, the functional units can be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional unit can be configured to perform different operations.

In some embodiments, each of the SMs 310 is configured to concurrently process one or more cooperative thread arrays ("CTAs") 390. Each CTA 390 is also referred to herein as a "thread group" and a "thread block." Each CTA 390 can be a single thread, a single-dimensional array of threads, or a multi-dimensional block of threads that is configured to concurrently execute the same program on different input data. Each CTA 390 that is configured to concurrently execute a given kernel on different input data is also referred to herein as "a thread group instance" of the kernel. In some embodiments, each of the SMs 310 can concurrently process a maximum number of CTAs 390 (e.g., one, two, etc.) that is dependent on the size of the CTAs 390.

In some embodiments, each thread in each CTA 390 is assigned a unique thread identifier ("ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write. In some embodiments, the threads in each CTA 390 can synchronize together, collaborate, communicate, or any combination thereof in any technically feasible fashion (e.g., via a shared memory).

In some embodiments, thread blocks that are configured to execute the same kernel are organized into a single dimensional or multi-dimensional grid. In the same or other embodiments, each CTA 390 is assigned a unique CTA ID that is accessible to each thread in the CTA 390 during the thread's execution. The configurations (e.g., size, dimensions, etc.) of grids and CTAs 390 can be determined in any technically feasible fashion. For instance, in some embodiments, the configuration of each grid and the configuration of the CTAs 390 in the grid is determined by the programmer and the amount of hardware resources, such as memory or registers, available to the grid and the CTAs 390.

Referring back to FIG. 2 as well as FIG. 3, in some embodiments, each CTA 390 in a given grid is scheduled onto one of the SMs 310 included in PPU 202 by a virtualized parallel runtime. Subsequently, the threads in each CTA 390 concurrently execute the same program on different input data, with each thread in the CTA 390 executing on a different execution unit within the SM 310 that the CTA 390 is scheduled onto.

In some embodiments, each CTA 390 can include fewer threads than the number of execution units within the SM 310 that the CTA 390 is scheduled onto, in which case some of the execution units can be idle during cycles when that CTA 390 is being processed. In the same or other embodiments, each CTA 390 can include more threads than the number of execution units within the SM 310 that the CTA 390 is scheduled onto, in which case processing can occur over consecutive clock cycles. In some embodiments, since each of the SMs 310 can support up to G CTAs concurrently, it follows that up to G*M CTAs can be executing in the GPC 208 at any given time.

In some embodiments, each of the SMs 310 contains a level one ("L1") cache (not shown in FIG. 3) or uses space in a corresponding L1 cache outside of the SM 310 to support, among other things, load and store operations. Each of the SMs 310 also has access to level two ("L2") caches (not shown) that are shared among all the GPCs 208 in the PPU 202. In some embodiments, the L2 caches can be used to transfer data between threads. Finally, the SMs 310 also have access to off-chip "global" memory, which can include the PP memory 204 and/or the system memory 104. It is to be understood that any memory external to the PPU 202 can be used as global memory. Additionally, as shown in FIG. 3, a level one-point-five ("L1.5") cache 335 can be included within the GPC 208 and configured to receive and hold data requested from memory via the memory interface 214 by the SM 310 and provide the requested data to the SM 310. Such data can include, without limitation, instructions, uniform data, and constant data. In embodiments having multiple SMs 310 within the GPC 208, the SMs 310 can beneficially share common instructions and data cached in the L1.5 cache 335.

Each GPC 208 can have an associated memory management unit ("MMU") 320 that is configured to map virtual addresses into physical addresses. In various embodiments, the MMU 320 can reside either within the GPC 208 or within the memory interface 214. The MMU 320 includes a set of page table entries used to map a virtual address to a physical address of a tile or memory page and optionally a cache line index. The MMU 320 can include address translation lookaside buffers or caches that can reside within the SMs 310, within one or more L1 caches, or within the GPC 208.

In some embodiments, each SMs 310 transmits a processed task to the work distribution crossbar 330 in order to provide the processed task to another GPC 208 for further processing or to store the processed task in an L2 cache (not shown), the PP memory 204, or the system memory 104 via the crossbar unit 210.

It will be appreciated that the core architecture described herein is illustrative and that variations and modifications are possible. Among other things, any number and/or types of processing units, such as the SMs 310, can be included within the GPC 208. Further, as described above in conjunction with FIG. 2, the PPU 202 can include any number of the GPCs 208 that are configured to be functionally similar to one another so that execution behavior does not depend on which of the GPCs 208 receives a particular processing task. Further, in some embodiments, each of the GPCs 208 operates independently of the other GPCs 208 in the PPU 202 to execute tasks for one or more application programs. In view of the foregoing, persons of ordinary skill in the art will appreciate that the architecture described in FIGS. 1-3 in no way limits the scope of the present disclosure.

As shown in italics for an exemplar CTA 390, in some embodiments, each thread in each of multiple CTAs 390 concurrently executes the GEMM kernel 192. The CTAs 390 can be configured as thread group instances of the GEMM kernel 192 and scheduled onto the SMs 310 in any technically feasible fashion. Referring back to FIG. 1 as well as FIG. 3, in some embodiments, the dispatch application 180 launches the GEMM kernel 192 for a grid (not shown) of CTAs 390 having a grid size that is equal to the maximum wave size for the PPU 202. In response, a virtualized parallel runtime schedules the corresponding thread group instances of the GEMM kernel 192 evenly across the SMs 310 included in the PPU 202. In a single wave, each CTA 390 in the grid executes different MAC iterations based on different input data to collectively perform a parallel GEMM computation. An exemplar parallel GEMM computation is described in greater detail below in conjunction with FIG. 5.

For explanatory purposes only, multiple instances of like objects are denoted herein with reference numbers identifying the object and parenthetical alphanumeric character(s) identifying the instance where needed.

Configuring a PPU to Perform a Parallel GEMM Computation

Figure 4:
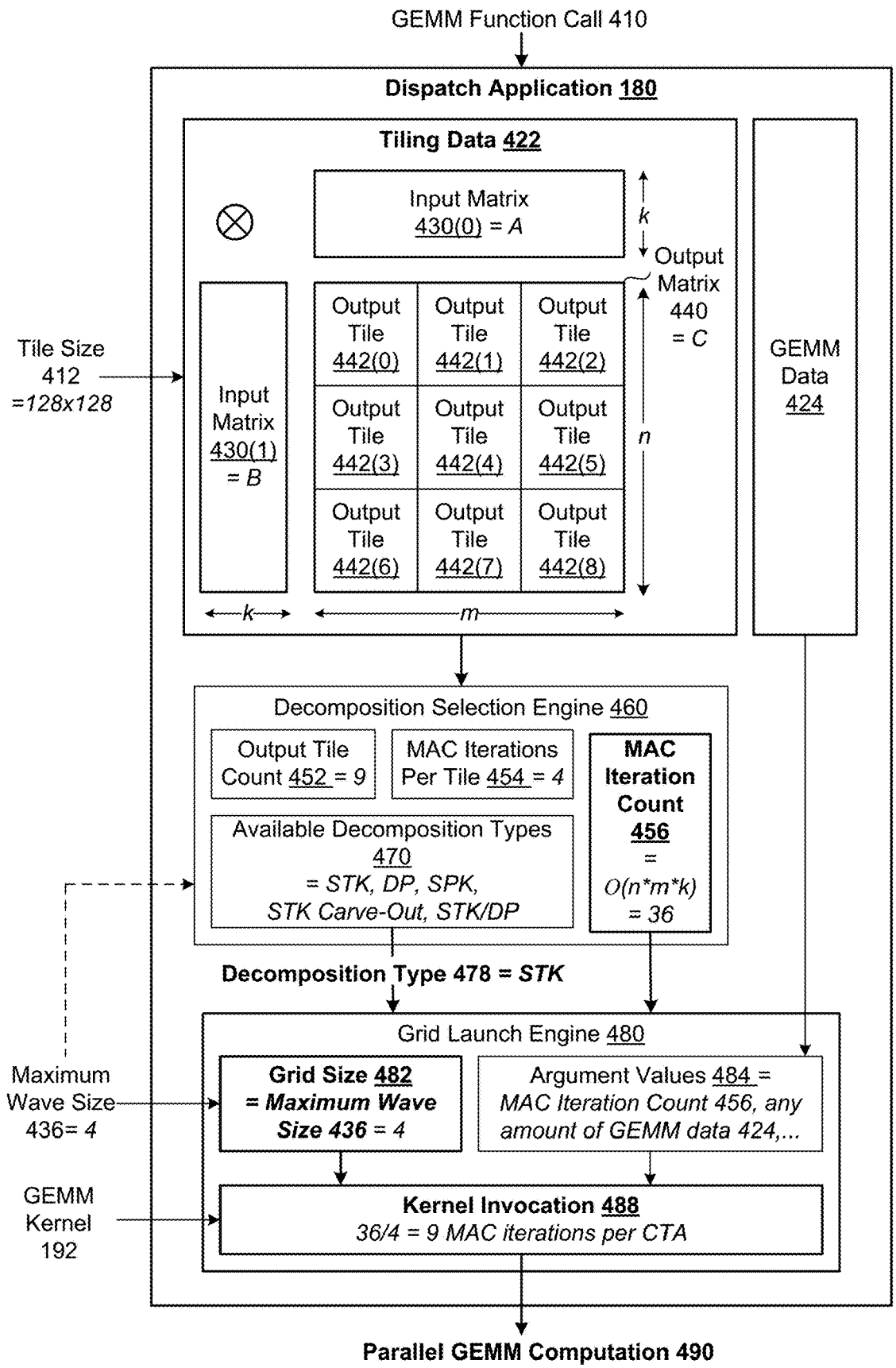
FIG. 4 is a more detailed illustration of the dispatch application of FIG. 1, according to various embodiments.

FIG. 4 is a more detailed illustration of the dispatch application 180 of FIG. 1, according to various embodiments. For explanatory purposes only, in the embodiment depicted in and described in conjunction with FIG. 4, the dispatch application 180 configures the PPU 202 to perform a parallel GEMM computation 490 in response to a GEMM function call 410. In some other embodiments, the dispatch application 180 can configure any number of PPUs 202 to perform any number and/or types of parallel MAC computations in response to any number and/or types of function calls received from any number and/or types of programs.

The GEMM function call 410 can specify a GEMM and any number and/or type of associated GEMM characteristics in any technically feasible fashion. In some embodiments, the GEMM function call 410 defines the GEMM based on the function $C=\alpha AB+\beta C$, where A is an input matrix 430(0) having dimensions m*k, B is an input matrix 430(1) having dimensions k*n, C is an output matrix 440 having dimensions m*n, $\alpha$ and $\beta$ are scalar inputs, and m, n, and k can be any integers. Some examples of GEMM characteristics include, without limitation, the type and layout of the input matrix 430(0), the input matrix 430(1), and the output matrix 440.

Based on the GEMM function call 410, the dispatch application 180 determines the GEMM kernel 192 that is to be used to compute the GEMM. In some embodiments, the GEMM kernel 192 selected by the dispatch application 180 divides a specified number of MAC iterations equitably across a specified warp of SMs 310 to perform the GEMM specified via the GEMM function call 410. The dispatch application 180 can determine the GEMM kernel 192 in any technically feasible fashion. For instance, in some embodiments, the dispatch application 180 selects the GEMM kernel 192 from any number of GEMM kernels 192 in the kernel library 190 based on any number of the GEMM characteristics and/or any number of characteristics of the PPU 202.

As shown, in some embodiments, the dispatch application 180 includes, without limitation, tiling data 422, GEMM data 424, a decomposition selection engine 460, and a grid launch engine 480. The dispatch application 180 generates the tiling data 422 based on the GEMM function call 410 and a tile size 412. To generate the tiling data 422, the dispatch application 180 partitions the output matrix 440 into output tiles 442 based on the tile size 412. In some embodiments, the tile size 412 is optimized for one or more characteristics of the PPU 202. For instance, in some embodiments, the tile size 412 is selected to fit into on-chip memory (e.g., 128×128).

For explanatory purposes only, the functionality of the dispatch application 180 is depicted in FIG. 4 is the context of an exemplar embodiment in which the dispatch application 180 partitions the output matrix 440 into output tiles 442(0)-442(8). In some other embodiments, the dispatch application 180 can partition the output matrix 440 into any number of output tiles 442, and the techniques described herein are modified accordingly. As shown, the tiling data 422 includes, without limitation, the input matrix 430(0), the input matrix 430(1), and the output matrix 440 that is partitioned into the output tiles 442(0)-442(8).

The dispatch application 180 generates the GEMM data 424 based on the GEMM function call 410 and optionally the tiling data 422. The GEMM data 424 can include, without limitation, any amount and/or type of data that describes any number of aspects of the GEMM specified via the GEMM function call 410 that are relevant to the GEMM kernel 192 in any technically feasible fashion. For instance, in some embodiments, the GEMM data 424 includes, without limitation, any amount and/or type of physical layout data (e.g., memory pointers), and any amount and/or types of metadata (e.g., matrix dimensions, strides, paddings, etc.) that describe the GEMM specified via the GEMM function call 410.

In some embodiments, the decomposition selection engine 460 sets an output tile count 452 equal to the total number of output tiles 442 included in the output matrix 440. As depicted in italics, for the exemplar embodiment depicted in FIG. 4, the output tile count 452 is nine. Based on a definition of MAC iteration, the decomposition selection engine 460 determines a MAC iterations per tile 454. As described previously herein, a MAC iteration is a fixed amount of parallel processing element progress (as measured in logical MAC operations) in the accumulation dimension (e.g., the k-axis) that is not further subdivided across parallel processing elements. In the context of FIG. 4, a MAC iteration is a fixed amount of SM progress in the accumulation dimension that is not further subdivided across the SMs 310. In some embodiments, the MAC iteration is defined by how the GEMM kernel 192 computes each GEMM. As depicted in italics, for the exemplar embodiment depicted in FIG. 4, the MAC iterations per tile 454 is four.

The decomposition selection engine 460 sets a MAC iteration count 456 equal to the product of the output tile count 452 and the MAC iterations per tile 454. As depicted in italics, in some embodiments, the MAC iteration count 456 is on the order of (n*m*k). In the exemplar embodiment depicted in FIG. 4, the MAC iteration count 456 is equal to the product of nine and four and is therefore thirty-six (depicted in italics).

As shown, in some embodiments, the decomposition selection engine 460 selects a decomposition type 478 from available decomposition types 470. The decomposition type 478 specifies a parallel decomposition strategy, and the available decomposition types 470 includes, without limitation, any number and/or types parallel decomposition strategies that are supported by the GEMM kernel 192. At least one of the available decomposition types 470 is the iteration-based parallel decomposition strategy of dividing the MAC iterations included in a MAC computation equitably across parallel processing elements. The iteration-based parallel decomposition strategy is also referred to herein as "stream-k" and is denoted as "STK." In the context of the PPU 202, STK therefore refers to the strategy of dividing the MAC iteration count 456 of MAC iterations equitable across the SMs 310.

The decomposition selection engine 460 can select the decomposition type 478 in any technically feasible fashion based on any amount and/or type of relevant data. In some embodiments, the decomposition selection engine 460 applies any number and/or types of algorithms (e.g., rules, heuristics, etc.) to select the decomposition type 478 based on the tiling data 422, any amount and/or types of data associated with the PPU 202, or any combination thereof. As depicted with a dashed arrow, in some embodiments, the decomposition selection engine 460 can take into account a maximum wave size 436 when determining the decomposition type 478.

The maximum wave size 436 specifies a maximum number of CTAs 390 that can execute concurrently on the SMs 310 included in the PPU 202. In some embodiments, at most one CTA 390 can execute concurrently on each SM 310, and the maximum wave size 436 is therefore equal to the total number of SMs 310 included in the PPU 202. In some other embodiments, at most two CTAs 390 can execute concurrently on each SM 310, and the maximum wave size 436 is therefore equal to twice the total number of SMs 310 included in the PPU 202. For explanatory purposes only, in the exemplar embodiment depicted in FIGS. 4 and 5, at most one CTA 390 can execute concurrently on each SM 310, the total number of SMs 310 included in the PPU 202 is equal to four, and the maximum wave size 436 is equal to four (depicted in italics).

As depicted in italics, in some embodiments, the available decomposition types 470 include, without limitation, STK, data-parallel ("DP"), split-k ("SPK"), STK carve-out, and STK/DP. In an STK decomposition strategy, each GEMM is computed in a single full wave of concurrently executing CTAs 390. If the decomposition type 478 is STK, then the grid launch engine 480 launches the GEMM kernel 192 with a grid size 482 that is equal to the maximum wave size 436. As shown in italics, in the embodiment depicted in FIG. 4, the decomposition selection engine 460 selects the decomposition type 478 of STK. The grid launch engine 480 is described in greater detail below in the context of the decomposition type 478 of STK.

As persons skilled in the art will recognize, DP and SPK are conventional tile-based parallel decomposition strategies. In a DP strategy, each output tile 442 is computed by a single one of the CTAs 390. In some embodiments, if the decomposition type 478 is DP, then the grid launch engine 480 launches the GEMM kernel 192 with the grid size 482 that is equal to the output tile count 452. In an SPK strategy, each output tile 442 is computed by an even multiple of CTAs 390. In some embodiments, if the decomposition type 478 is SPK, then the grid launch engine 480 launches the GEMM kernel 192 with the grid size 482 that is equal to the product of the output tile count 452 and a splitting factor.

In some embodiments, if the output tile count 452 is significantly greater than the maximum wave size 436, then GEMM execution time (not shown in FIG. 4) can be significant. Selecting the decomposition type 478 of STK can therefore effectively "camp" the PPU 202. To allow other high priority processor tasks to run concurrently with the GEMM, in some embodiments, the decomposition selection engine 460 selects the decomposition type 478 of STK carve-out or STK/DP.

In some embodiments, if the decomposition type 478 is STK carve-out, then the grid launch engine 480 launches the GEMM kernel 192 with a grid size 482 that is less than the maximum wave size 436. Accordingly, the MAC iterations are equitably divided across a subset of the SMs 310, while other SMs 310 are available for other high priority processor tasks. In the same or other embodiments, if the decomposition type 478 is STK/DP, then the grid launch engine 480 launches the GEMM kernel 192 such that the GEMM is computed over one STK wave and one or more DP waves. More precisely, the grid launch engine 480 launches the GEMM kernel 192 such that the total number of DP waves is equal to floor((output tile count 452)/tiles per wave)−0.5).

As shown, the grid launch engine 480 includes, without limitation, the grid size 482, argument values 484, and a kernel invocation 488. For explanatory purposes only, the functionality of the grid launch engine 480 is described herein in the context of the decomposition type 478 of STK. Because the decomposition type 478 is STK, the grid launch engine 480 sets the grid size 482 equal to the maximum wave size 436. As depicted in italics, in the exemplar embodiment depicted in FIG. 4, the grid launch engine 480 sets the grid size 482 equal to four.

The argument values 484 are values for arguments of the GEMM kernel 192. In some embodiments, the argument values 484 include, without limitation, the MAC iteration count 456 and any amount of the GEMM data 424. In the same or other embodiments, the arguments of the GEMM kernel 192 can vary, and the argument values 484 vary accordingly. For instance, in some embodiments, the arguments of the GEMM kernel 192 include a MAC iterations per CTA (not shown) instead of the MAC iteration count 456. In the same or other embodiments, the grid launch engine 480 computes the MAC iterations per CTA based on the MAC iteration count 456 and the grid size 482. In some embodiments, any amount of functionality associated with determining the set of MAC iterations that each CTA 390 executes and the set of MAC iterations that is associated with each output tile 442 can be divided between the dispatch application 180 and the GEMM kernel 192 in any technically feasible fashion.

As shown, in some embodiments, the grid launch engine 480 launches the GEMM kernel 192 via the kernel invocation 488. The kernel invocation 488 includes, without limitation, the name of the GEMM kernel 192, an execution configuration (not shown), and the argument values 484 for the arguments of the GEMM kernel 192. In some embodiments, the execution configuration specifies, without limitation, the grid size 482, a CTA size (not shown), and optionally any amount of temporary storage.

In some embodiments, the grid size 482 and/or the CTA size can be single dimensional or multi-dimensional. In the same or other embodiments, the temporary storage specifies any per-CTA amount and/or type of memory that can be shared among the threads included in each CTA 390. In some embodiments, the temporary storage is used to facilitate any amount and/or types of tile coordination operations associated with output tiles 442 that are split across CTAs 390. Tile coordination operations are described in greater detail below in conjunction with FIGS. 5 and 6.

In some embodiments, in response to the kernel invocation 488, a virtualized parallel runtime (not shown) dispatches a grid of CTAs 390 across the SMs 310 included in the PPU 202. Notably, each thread in the grid of CTAs 390 is configured to execute the GEMM kernel 192 on different input data. Scheduling unit(s) within the PPU 202 (e.g., the work distribution unit within the task/work unit 207 and the pipeline managers 305 within the GPCs 208) schedule the grid of CTAs 390 evenly onto the SMs 310. The CTAs 390 included in the grid of CTAs 390 collectively and concurrently execute the parallel GEMM computation 490.

Executing MAC Iterations Included in a Parallel GEMM Computation

Figure 5:
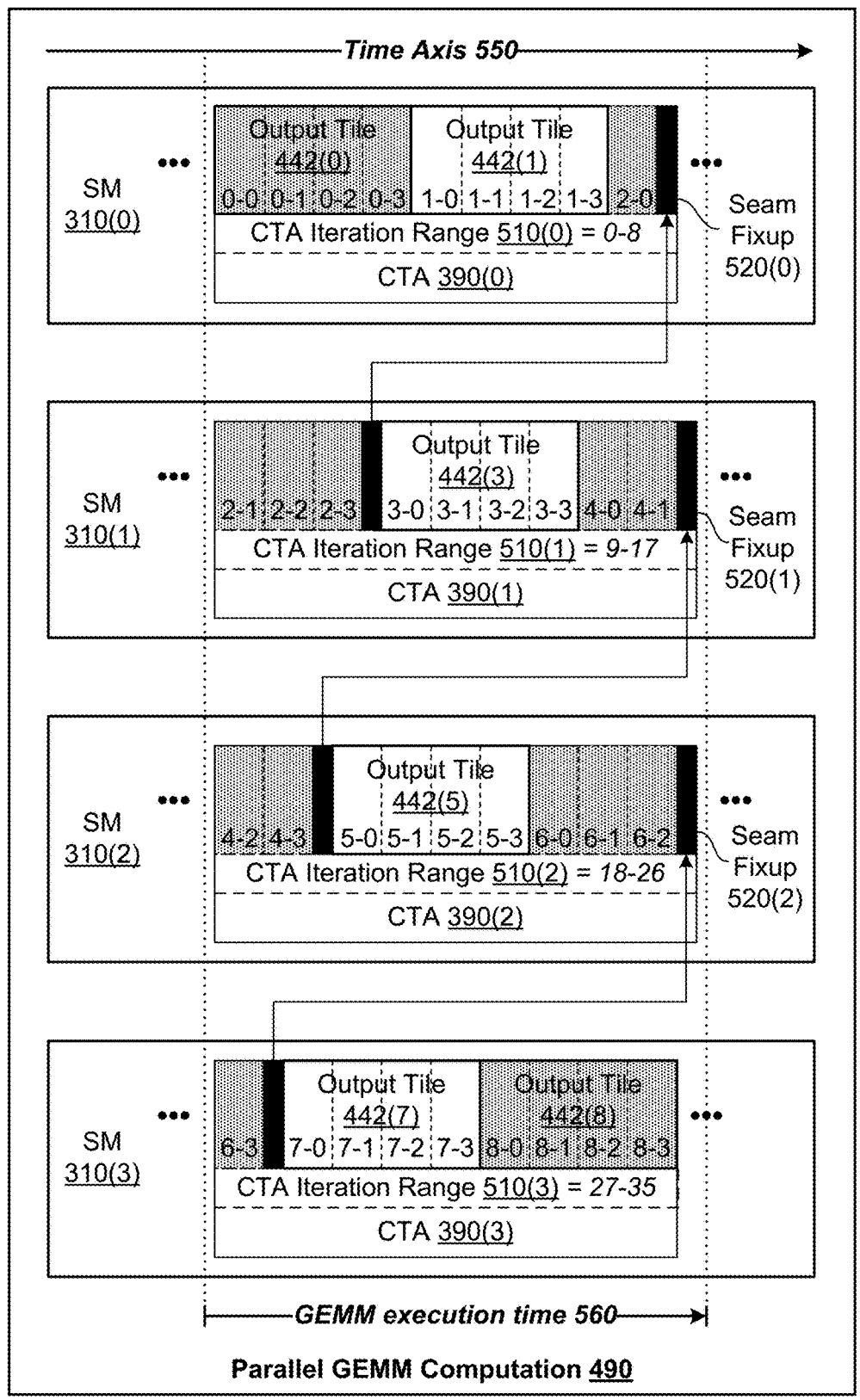
FIG. 5 is an exemplar illustration of the parallel GEMM computation of FIG. 4, according to various embodiments.

FIG. 5 is an exemplar illustration of the parallel GEMM computation 490 of FIG. 4, according to various embodiments. For explanatory purposes only, the parallel GEMM computation 490 is described in the context of the example of the kernel invocation 488 described previously herein in conjunction with FIG. 4 that configures the GEMM kernel 192 to implement the decomposition type 478 of STK. More specifically, the grid size 482 specified via the execution configuration of the kernel invocation 488 is equal to the maximum wave size 436 of four and the MAC iteration count 456 specified via the argument values 484 corresponding to the arguments of the GEMM kernel 192 is thirty-six.

In the embodiment depicted in FIG. 5, because the grid size 482 is four, the virtualized parallel runtime (not shown in FIG. 5) associated with the PPU 202 causes the PPU 202 to execute the GEMM kernel 192 as a grid of CTAs 390(0)-390(3). Scheduling unit(s) within the PPU 202 (e.g., the work distribution unit within the task/work unit 207 and the pipeline managers 305 within the GPCs 208) schedule the CTAs 390(0)-390(3) evenly onto the SMs 310 based on the maximum number of CTAs 390 that each SM 310 can concurrently process.

Referring back now to FIG. 4, the maximum wave size is equal to four. Accordingly, the SMs 310 can concurrently execute a total of four CTAs 390. For explanatory purposes only, in the embodiment depicted in FIG. 5, the PPU 202 includes, without limitation, SMs 310(0)-310(3), and each of the SMs 310 can concurrently execute a maximum of one of the CTAs 390(0)-390(3). The scheduling unit(s) therefore schedule the CTAs 390(0)-390(3) onto the SMs 310(0)-310(3), respectively. And the CTAs 390(0)-390(3) execute concurrently in a single, full wave to compute the output tiles 442 included in the output matrix 440 specified via the argument values 484.

Referring back now to FIG. 4, the output matrix 440 includes, without limitation, the output tiles 442(0)-442(8), and the MAC iterations per tile 454 is four. Accordingly, each of the output tiles 442(0)-442(8) is associated with a different subset of four of the thirty-six MAC iterations include in the parallel GEMM computation 490. For explanatory purposes only, the four MAC iterations that are associated with each output tile 442 are also referred to herein as "tile iterations" of the output tile 442. Across the output tiles 442, each of the thirty-six tile iterations is a different one of the thirty-six MAC iterations that the CTAs 390(0)-390(3) execute to perform the parallel GEMM computation 490.

For explanatory purposes only, in the context of FIG. 5, tile iterations are denoted as x-y, where x is an index into the output tiles 442 and y is an index into the subset of four MAC iterations associated with the output tile 442(x). The tile iterations associated with the output tile 442(0) that are denoted 0-0, 0-1, 0-2, and 0-3 are the MAC iterations 0-3, respectively. The tile iterations associated with the output tile 442(1) that are denoted 1-0, 1-1, 1-2, and 1-3 are the MAC iterations 4-7, respectively. The tile iterations associated with the output tile 442(2) that are denoted 2-0, 2-1, 2-2, and 2-3 are the MAC iterations 8-11, respectively. The tile iterations associated with the output tile 442(3) that are denoted 3-0, 3-1, 3-2, and 3-3 are the MAC iterations 12-15, respectively. The tile iterations associated with the output tile 442(4) that are denoted 4-0, 4-1, 4-2, and 4-3 are the MAC iterations 16-19, respectively. The tile iterations associated with the output tile 442(5) that are denoted 5-0, 5-1, 5-2, and 5-3 are the MAC iterations 20-23, respectively. The tile iterations associated with the output tile 442(6) that are denoted 6-0, 6-1, 6-2, and 6-3 are the MAC iterations 24-27, respectively. The tile iterations associated with the output tile 442(7) that are denoted 7-0, 7-1, 7-2, and 7-3 are the MAC iterations 28-32, respectively. The tile iterations associated with the output tile 442(8) that are denoted 8-0, 8-1, 8-2, and 8-3 are the MAC iterations 33-36, respectively.

Each of the CTAs 390(0)-390(3) can be configured to perform an equitable number of MAC iterations in any technically feasible fashion. In some embodiments, and as described in greater detail below in conjunction with FIG. 6, as per the GEMM kernel 192, each CTA 390 initializes a CTA iteration ("cta_itr") to a CTA start iteration and determines a CTA last iteration ("cta_last_itr") based on the associated CTA ID, the grid size 482, and the MAC iteration count 456. For each CTA 390, the number of MAC iterations is equal to (CTA last iteration−CTA start iteration+1). In general, number of MAC iterations executed by each of the CTAs 390 varies by at most one. More specifically, each of CTAs 390 executes either x or (x+1) MAC iterations, where x can be any positive integer.

For the embodiment depicted in FIG. 5, CTA iteration ranges 510(0)-510(3) specify the MAC iterations executed by the CTAs 390(0)-390(3), respectively. The CTA iteration range 510(0) specifies that the CTA 390(0) executes the MAC iterations 0-8. The CTA iteration range 510(1) specifies that the CTA 390(1) executes the MAC iterations 9-17. The CTA iteration range 510(2) specifies that the CTA 390(2) executes the MAC iterations 18-26. The CTA iteration range 510(3) specifies that the CTA 390(3) executes the MAC iterations 27-35.

In some other embodiments, the parallel GEMM computation 490 can be executed by any number of CTAs 390 executing on any number of SMs 310 over a single wave. In the same or other embodiments, the parallel GEMM computation 490 can include any number of MAC iterations and can generate any number of output tiles 442. In some embodiments, the decomposition type 478 can vary across the CTAs 390 in a given grid, the number of MAC iterations executed by the CTAs 390 can vary, and the number of waves can be greater than one.

Importantly, if the MAC iterations per CTA (the MAC iteration count 456 divided by the grid size 482) is not an even multiple of the MAC iterations per tile 454, then the tile iterations for one or more of the output tiles 442 are split across CTAs 390. For each output tile 442 that is split across a subset of CTAs 390, each CTA 390 included in the subset of the CTAs 390 executes one or tile coordination operations associated with the output tile 442. As described in greater detail below in conjunction with an example of the GEMM kernel 192, in some embodiments, tile coordination operations include, without limitation, carry-out operations, carry-in operations, wait operations, and carry-in accumulation operations. In some other embodiments, the CTAs 390 can perform any number and/or types of tile coordination operations in any technically feasible fashion.

For illustrative purposes only, the parallel GEMM computation 490 is depicted vertically across the SMs 310(0)-310(3) and horizontally along a time axis 550. GEMM execution time 560 depicted along the time axis 550 includes, without limitation, overhead associated with launching the grid, the time from when the first of the CTAs 390 begins executing to when the last of the CTAs 390 finishes executing, and overhead associated with terminating the grid. The CTAs 390(0)-390(3) are depicted within the SMs 310(0)-310(3), respectively, and annotated with the CTA iteration ranges 510(0)-510(3), respectively. The tile iterations associated with the output tiles 442(0), 442(2), 442(4), 442(6), and 442(8) are depicted via shaded dashed boxes. The tile iterations associated with the output tiles 442(1), 442(3), 442(5), and 442(7) are depicted via unshaded dashed boxes.

As shown, the CTA 390(0) executes the MAC iterations 0-8 corresponding to the tile iterations 0-0, 0-1, 0-2, and 0-3 of the output tile 442(0), the tile iterations 1-0, 1-1, 1-2, and 1-3 of the output tile 442(1), and the tile iteration 2-0 of the output tile 442(2). In some embodiments, because the CTA 390(0) executes all tile iterations of the output tile 442(0), the CTA 390(0) generates the output tile 442(0) after executing the tile iteration 0-3. Similarly, because the CTA 390(0) executes all tile iterations of the output tile 442(1), the CTA 390(0) generates the output tile 442(1) after executing the tile iteration 1-3.

By contrast, because the CTA 390(0) executes the tile iteration 2-1 of the output tile 442(2) but does not execute the tile iteration 2-3 of the output tile 442(2), the CTA 390(0) executes a set of operations specified in the GEMM kernel 192 and denoted herein as a seam fixup 520(0) to generate the output tile 442(2). As per the seam fixup 520(0), the CTA 390(0) waits as necessary for the other CTAs 390 to finishing executing the tile iterations 2-1, 2-2, and 2-3 of the output tile 442(2).

As shown, the CTA 390(1) executes the MAC iterations 9-11 corresponding to the tile iterations 2-1, 2-2, and 2-3 of the output tile 442(2) before the CTA 390(0) executes the seam fixup 520(0). Because the CTA 390(1) does not execute the tile iteration 2-0, the CTA 390(1) carries-out a set of partial sums associated with the tile iterations 2-1, 2-2, and 2-3. In some embodiments, to carry-out the set of partial sums, the CTA 390(1) stores the set of partial sums in a memory that is accessible to all CTAs 390 in the grid.

Because the CTA 390(1) finishes executing the tile iterations 2-1, 2-2, and 2-3 before the CTA 390(0) executes the seam fixup 520(0), the CTA 390(0) does not need to wait for the CTA 390(1). As per the seam fixup 520(0), the CTA 390(0) carries-in the set of partial sums associated with the tile iterations 2-1, 2-2, and 2-3. In some embodiments, to carry-in the set of partial sums, the CTA 390(0) reads the set of partial sums from a memory that is accessible to all CTAs 390 in the grid. Subsequently, the CTA 390(0) accumulates the set of partial sums associated with the tile iterations 2-1, 2-2, and 2-3 into a set of partial sums associated with the tile iteration 2-0 to generate elements of a matrix product that are associated with the output tile 442(2). The CTA 390(0)

then generates the output tile 442(2) based on the elements of the matrix product. The CTA 390(0) then ceases to execute.

After executing the carry-out associated with the tile iterations 2-1, 2-2, and 2-3, the CTA 390(1) executes the MAC iterations 12-17 corresponding to the 3-0, 3-1, 3-2, and 3-3 tile iterations of the output tile 442(3) and the tile iterations 4-0 and 4-1 of the output tile 442(4). Because the CTA 390(1) executes all tile iterations of the output tile 442(3), the CTA 390(1) generates the output tile 442(3) after executing the tile iteration 3-3.

By contrast, because the CTA 390(1) executes the tile iteration 4-0 of the output tile 442(4) but does not execute the tile iteration 4-3 of the output tile 442(4), the CTA 390(1) executes a set of operations specified in the GEMM kernel 192 and denoted herein as a seam fixup 520(1) to generate the output tile 442(4). As per the seam fixup 520(1), the CTA 390(1) waits as necessary for the other CTAs 390 to finishing executing the tile iterations 4-2 and 4-3 of the output tile 442(4).

As shown, the CTA 390(2) executes the MAC iterations 18-19 corresponding to the tile iterations 4-2 and 4-3 of the output tile 442(4) before the CTA 390(1) executes the seam fixup 520(1). Because the CTA 390(2) does not execute the tile iteration 4-0, the CTA 390(2) carries-out a set of partial sums associated with the tile iterations 4-2 and 4-3 of the output tile 442(4).

Because the CTA 390(2) finishes executing the tile iterations 4-2 and 4-3 of the output tile 442(4) before the CTA 390(1) executes the seam fixup 520(1), the CTA 390(1) does not need to wait for the CTA 390(2). As per the seam fixup 520(1), the CTA 390(1) carries-in the set of partial sums associated with the tile iterations 4-2 and 4-3. Subsequently, the CTA 390(1) accumulates the set of partial sums associated with the tile iterations 4-2 and 4-3 into a set of partial sums associated with the tile iterations 4-0 and 4-1 to generate elements of the matrix product that are associated with the output tile 442(4). The CTA 390(1) generates the output tile 442(4) based on the elements of the matrix product. The CTA 390(1) then ceases to execute.

After performing the carry-out associated with the tile iterations 4-2 and 4-3 of the output tile 442(4), the CTA 390(2) executes the MAC iterations 20-26 corresponding to the tile iterations 5-0, 5-1, 5-2, and 5-3 of the output tile 442(5) and the tile iterations 6-0, 6-1, and 6-2 of the output tile 442(6). Because the CTA 390(2) executes all tile iterations of the output tile 442(5), the CTA 390(2) generates the output tile 442(5) after executing the tile iteration 5-3.

By contrast, because the CTA 390(2) executes the tile iteration 6-0 of the output tile 442(6) but does not execute the tile iteration 6-3 of the output tile 442(6), the CTA 390(2) executes a set of operations specified in the GEMM kernel 192 and denoted herein as a seam fixup 520(2) to generate the output tile 442(6). As per the seam fixup 520(2), the CTA 390(2) waits as necessary for the other CTAs 390 to finishing executing the tile iteration 6-3 of the output tile 442(6).

As shown, the CTA 390(3) executes the MAC iteration 27 corresponding to the tile iteration 6-3 of the output tile 442(6) before the CTA 390(2) executes the seam fixup 520(2). Because the CTA 390(3) does not execute the tile iteration 6-0, the CTA 390(3) carries-out a set of partial sums associated with the tile iteration 6-3 of the output tile 442(6).

Because the CTA 390(3) finishes executing the tile iteration 6-3 of the output tile 442(6) before the CTA 390(2) executes the seam fixup 520(2), the CTA 390(2) does not need to wait for the CTA 390(3). As per the seam fixup 520(2), the CTA 390(2) carries-in the set of partial sums associated with the tile iteration 6-3. Subsequently, the CTA 390(2) accumulates the set of partial sums associated with the tile iteration 6-3 into a set of partial sums associated with the tile iterations 6-0, 6-1, and 6-2 to generate elements of the matrix product that are associated the output tile 442(6). The CTA 390(2) generates the output tile 442(6) based on the elements of the matrix product. The CTA 390(2) then ceases to execute.

After performing the carry-out associated with the tile iteration 6-3 of the output tile 442(6), the CTA 390(3) executes the MAC iterations 28-35 corresponding to the tile iterations 7-0, 7-1, 7-2, and 7-3 of the output tile 442(7) and the tile iterations 8-0, 8-1, 8-2, and 8-3 of the output tile 442(8). Because the CTA 390(3) executes all tile iterations of the output tile 442(7), the CTA 390(3) generates the output tile 442(7) after executing the tile iteration 7-3. Because the CTA 390(3) executes all tile iterations of the output tile 442(8), the CTA 390(3) generates the output tile 442(8) after executing the tile iteration 8-3. The CTA 390(3) then ceases to execute.

As illustrated in FIG. 5, when the decomposition type 478 is STK, the MAC iterations are divided equitably between the CTAs 390 and the CTAs 390 are divided evenly between the SMs 310 irrespective of the tile size 412 and the GEMM characteristics. Furthermore, in some embodiments, the total number of seam fixups 520 is less than the total number of CTAs 390, none of the CTAs 390 need to wait for any of the other CTAs 390, and the tile coordination operations are a relatively small percentage of the GEMM execution time 560. By defining a MAC iteration such that the total number of MAC operations included in each MAC iteration is significantly less than the total number of MAC operations required to compute each output tile 442, any multi-core processor underutilization associated with computing the GEMM can be decreased relative to prior tile-based parallel decomposition techniques. More specifically, any processor underutilization associated with computing a given GEMM on the PPU 202 can be decreased relative to conventional tile-based parallel decompositions approaches.

Notably, the iteration-based parallel decomposition techniques disclosed herein effectively scale to different shapes of the output matrix 440. For instance, in some embodiments the GEMM specified via the GEMM function call 410 has a "small output" shape in which the dimensions m and n are significantly smaller than the dimension k, the total number of output tiles 442 is one, and the MAC iterations per tile 454 are four times greater than the MAC iterations per CTA. In such embodiments, the SMs 310(0)-310(3) depicted in FIG. 5 each performs a fourth of the MAC iterations for the output tile 442(0). Accordingly, the iteration-based parallel decomposition disclosed herein is associated with nearly 100% processor utilization. By contrast, a conventional DP approach in which a single SM 310 generates the output tile 442(0) would be associated with at most a 25% processor utilization.

Notably, as illustrated in FIG. 5, the GEMM kernel 192 can implement the tile size 412 that is optimized for the PPU 202 without negatively impacting the distribution of the MAC iterations included in an associated GEMM across the SMs 310. More generally, each MAC computation kernel can implement the tile size 412 that is optimized for a given multi-core processor without negatively impacting the distribution of the MAC iterations included in an associated MAC computation across processing cores. Consequently, degradations in the computational throughput and latencies resulting from suboptimal tile size selection can be reduced.

FIG. 6 is an exemplar illustration of GEMM kernel pseudo code 610 for the GEMM kernel 192 of FIG. 4, according to various embodiments. For explanatory purposes only, the GEMM kernel pseudo code 610 is described in the context of the kernel invocation 488 corresponding to the decomposition type 478 of STK with a grid that includes, without limitation, the CTAs 390(0)-390(3). In some other embodiments, any number of instances of the kernel invocation 488 can be executed by any types of computing system that include multiple parallel processing elements at any level of hierarchy (e.g., the CPU 102, the PPU 202, etc.) based on any launch configuration and any number and/or types of arguments.

As shown, in some embodiments, The GEMM kernel pseudo code 610 includes, without limitation, a kernel declaration 620, initialization pseudo code 622, and an iteration-based processing loop 630. The kernel declaration 620 includes, without limitation, a "_global_" specifier indicating that the GEMM kernel pseudo code 610 is a definition of a kernel. More specifically, the kernel declaration 620 specifies that the GEMM kernel pseudo code 610 defines the GEMM kernel 192 that is denoted as "GemmKernel."

The initialization pseudo code 622 is executed by each of the CTAs 390 in the grid specified via the kernel invocation 488 to determine, without limitation, the CTA iteration range 510 for the CTA 390. In some embodiments, each CTA 390 initializes a CTA iteration ("cta_itr") to a CTA start iteration and determines a CTA last iteration ("cta_last_itr") based on the associated CTA ID, the grid size 482, and the MAC iteration count 456. Referring back to FIG. 4, for each CTA 390, the CTA iteration range 510 corresponds to the CTA start iteration through the CTA last iteration.

In some other embodiments, the arguments of the GEMM kernel 192 can vary and the initialization pseudo code 622 varies accordingly. For instance, in some embodiments, the arguments of the GEMM kernel 192 include a MAC iterations per CTA instead of the MAC iteration count 456, and each CTA 390 computes an associated CTA start iteration based on the associated CTA ID, the grid size 482, and the MAC iterations per CTA. Each CTA 390 then sets the CTA last iteration equal to (CTA start iteration+MAC iterations per CTA−1).

The iteration-based processing loop 630 is a work processing loop that is executed by each of the CTAs 390 in the grid that is specified via the kernel invocation 488. In some embodiments, the CTAs 390 execute the iteration-based processing loop 630 at least partially in parallel. Referring back to FIG. 5, the CTAs 390(0)-390(3) execute the iteration-based processing loop 630 based on CTA iteration ranges 510(0)-510(3), respectively, of 0-8, 9-17, 18-26, and 27-35, respectively. The iteration-based processing loop 630 includes, without limitation, a tile-based GEMM loop 640, carry-out pseudo code 650, seam fixup pseudo code 660, and epilogue pseudo code 670.

As each CTA 390 executes the iteration-based processing loop 630, the CTA 390 executes the tile-based GEMM loop 640 for each output tile 442 associated with MAC iterations that at least partially overlap the CTA iteration range 510 of the CTA 390. More precisely, each CTA 390 executes the tile-based GEMM loop 640 to generate accumulators (not shown) for the overlapping portion (if any) of the MAC iterations associated with each output tile 442. For each output tile 442 associated with MAC iterations that span two or more of the CTA iteration ranges 510, the accumulators are a set of partial sums for the elements of the matrix product associated with the output tile 442. For the remainder of the output tiles 442, the accumulators are the elements of the accumulated matrix product associated with the output tile 442.

For instance, referring back to FIG. 5, the CTA 390(1) executes the tile-based GEMM loop 640 to compute the elements of the accumulated matrix product associated with the output tile 442(0), re-executes the tile-based GEMM loop 640 to compute the elements of the accumulated matrix product associated with the output tile 442(1), and re-executes the tile-based GEMM loop 640 to generates a set of partial sums for the elements of the matrix product associated with the output tile 442(2).

The CTAs 390 can execute the tile-based GEMM loop 640 in any technically feasible fashion. As shown, in some embodiments, the tile-based GEMM loop 640 is encapsulated in a tile-based GEMM function denoted "gemm_tile," and the CTAs 390 call the tile-based GEMM function to execute the tile-based GEMM loop 640. The tile-based GEMM function generates accumulators (not shown) denoted "accum" based on an output tile ID, a starting tile iteration associated with the CTA 390, and a stopping tile iteration associated with the CTA 390. In some embodiments, the accumulator elements are held in registers of the participating threads. In the same or other embodiments, the starting tile iteration and the stopping tile iterations are specified with respect to steps in the accumulation dimension. For instance, if each of the output tiles 442 is associated with a different set of four MAC iterations, then the starting tile iterations and the ending tile iterations are integers between 0 and 3 specifying a total number of steps from k=0 in the accumulation dimension.

During the tile-based GEMM loop 640, the threads of the CTA 390 execute any number and/or types of MAC operations to effect the specified iterations for the output tile 442. For instance, in some embodiments, each thread of the CTA 390 executes one or more fused MAC operations on fragments of the input matrix 430(0), fragments of the input matrix 430(1), and any number of the accumulators that are held in registers. A fused MAC operation is a floating-point MAC operation performed in one step, with a single rounding. In the same or other embodiments, the tile-based GEMM loop 640 can implement any number and/or types of blocking strategies, any number and/or types of tiling strategies, and any number and/or types of other strategies to achieve any number and/or types of goals. In particular, in some embodiments, the tile-based GEMM loop 640 implements any number and/or types of strategies to increase data sharing and reuse.

After the CTA 390(x), where x is an integer from 0 to 3, executes the tile-based GEMM loop 640 associated with the output tile 442(y), where y is an integer from 0 to 8, the CTA 390(x) executes the carry-out pseudo code 650, the seam fixup pseudo code 660 followed by the epilogue pseudo code 670, or the epilogue pseudo code 670. If the CTA iteration range 510(x) does not include the initial tile iteration y−0 associated with the output tile 442(y), then the CTA 390(x) executes the carry-out pseudo code 650. If, however, the CTA iteration range 510(x) includes the initial tile iteration y−0 associated with the output tile 442(y) and does not include the final tile iteration (e.g., y−3) associated the output tile 442(y), then the CTA 390(x) executes the seam fixup pseudo code 660 followed by the epilogue pseudo code 670. If the CTA iteration range 510(x) includes all the MAC iterations associated with the output tile 442(y), then the CTA 390(x) executes the epilogue pseudo code 670.

In some embodiments, if the CTA 390(x) executes the carry-out pseudo code 650, then the CTA 390(x) stores the accumulators in a memory that is accessible to all CTAs 390 in the grid. As described previously herein, because the output tile 442(*y*) is associated with MAC iterations that span two or more of the CTA iteration ranges 510, the accumulators are a set of partial sums. As part of executing the carry-out pseudo code 650, the CTA 390(*x*) notifies the other CTAs 390 that the current MAC iteration is finished. The CTA 390(*x*) can notify the other CTAs 390 that the current MAC iteration is finished in any technically feasible fashion.

If, however, the CTA 390(*x*) executes the seam fixup pseudo code 660, then the CTA 390(*x*) performs one of the seam fixups 520 depicted in FIG. 5. As shown, to perform the seam fixup 520 in some embodiments, the CTA 390(*x*) waits until the final MAC iteration associated with the output tile 442(*y*) is complete. The CTA 390(*x*) then accumulates one or more sets of partial sums for the output tile 442(*y*) that are stored in a memory accessible to all CTAs 390 in the grid into the accumulators associated with the CTA 390(*x*). Subsequently, the CTA 390(*x*) executes the epilogue pseudo code 670.

If the CTA 390(*x*) executes the epilogue pseudo code 670, then the CTA 390(*x*) generates the output tile 442(*y*). The epilogue pseudo code 670 can specify, without limitation, any number and/or types of operations associated with generating the output tile 442(*y*). In some embodiments, the epilogue pseudo code 670 specifies, without limitation, any number and/or types of kernel calls (e.g., a call to an epilogue kernel). In the same or other embodiments, the epilogue pseudo code 670 specifies, without limitation, any number and/or types of element-wise operations, any number of data type conversions, any number and/or types of matrix update operations, and any number and/or types of other operations in any combination.

Some examples of element-wise operations are, without limitation, scaling operations, bias operations, and activation functions. Some examples of data type conversions are, without limitation, converting single-precision floating points to half-precision floating points, converting 32-bit signed integers to 8-bit signed integers, and packing accumulators into registers. Some examples of matrix update operations re, without limitation, read operations, write operations, and read-modify-write operations.

For instance, in some embodiments, the accumulators are the elements of the portion of the accumulated matrix product AB associated with the output tile 442. By contrast, the GEMM specified in the GEMM function call 410 is C=αAB+βC. Accordingly, as per the epilogue pseudo code 670, the CTA 390(*x*) performs scaling operations, accumulation operations, and read-modify-write operations to update the output tile 442(*y*) that is stored in global memory.

As described previously herein, the PPU 202 is an exemplar multi-core processor, and the SMs 310 are exemplar processor cores included in the multi-core processor. Furthermore, the CTAs 390 are exemplar thread groups that are dispatched across the multi-core processor via a virtualized parallel runtime associated with the parallel processing subsystem 112. In some other embodiments, the techniques described previously herein in conjunction with FIGS. 1-6 and in the context of the PPU 202, the SMs 310, and the CTAs 390 can be implemented in any type of multi-core processor that includes at least two of any type of processor core to perform any type of MAC computation via any type of parallel runtime.

FIG. 7 is a flow diagram of method steps for computing a GEMM on a multi-core processor, according to various embodiments. More specifically, the flow diagram of FIG. 7 is depicted and described in the context of performing a GEMM on a multi-core processor via a virtualized parallel runtime. Although the method steps are described in the context of the systems of FIGS. 1-6, persons skilled in the art will understand that any system configured to implement the method steps, in any order, falls within the scope of the present invention.

As shown, a method 700 begins at step 702, where the dispatch application 180 determines the GEMM kernel 192 based on zero or more GEMM characteristics of a given GEMM. At step 704, the dispatch application 180 partitions the output matrix 440 into output tiles 442 based on the tile size 412 and sets the output tile count 452 equal to the total number of output tiles 442. At step 706, the dispatch application 180 determines the MAC iterations per tile 454 based on the definition of a MAC iteration and the tile size 412. At step 708, the dispatch application 180 sets the MAC iteration count 456 equal to the product of the output tile count 452 and the MAC iterations per tile 454.

At step 710, the dispatch application 180 sets the grid size 482 equal to the maximum number of thread groups that can execute simultaneously on the parallel processing elements. At step 712, the dispatch application 180 invokes the GEMM kernel 192 for the thread group configuration and the grid size 482 based on at least the MAC iteration count 456, the input matrix 430(0), the input matrix 430(1), and the output matrix 440.

At step 714, the kernel invocation 488 causes an even share of the thread group instances of the GEMM kernel 192 to be scheduled onto each of the processor cores. At step 716, as scheduled, each thread group performs an equitable number of the MAC iterations, zero or more tile coordination operations, zero or more element-wise operations, and zero or more output tile write operations. When the last of the thread groups finishes executing, the output matrix 440 specifies the result of the GEMM. The method 700 then terminates.

Iteration-Based Parallel Decomposition Strategy for MAC Computations

As noted previously herein, the iteration-based parallel decomposition strategy described in conjunction with FIGS. 1-7 can be generalized for implementation in any type of computing system that includes without limitation, multiple parallel processing elements, to perform any number and/or types of MAC computations. In particular, the iteration-based parallel decomposition strategy can be implemented in computing systems of varying scopes.

For instance, in some embodiments, the computing system is a single processor core and the parallel processing elements are parallel logic units. In some other embodiments, the computing system is a computer node and the parallel processing elements are parallel processors. In yet other embodiments, the computing system is a distributed computer system and the parallel processing elements are parallel computer nodes. In some embodiments, the parallel decomposition strategy can be implemented at multiple hierarchical levels within a hierarchical computing system.

In some embodiments, MAC operations associated with a given MAC computation are parallelized via tasks, where each task is a program instance that is to be scheduled onto one of the parallel processing elements. The tasks can be scheduled onto the parallel processing elements in any technically feasible fashion. In some embodiments, any type of non-virtualized parallel runtime schedules the tasks onto the parallel processing elements, and the parallel processing elements directly execute the program.

In some other embodiments, each of the tasks is associated with one of multiple virtual processing elements and can be launched (e.g., forked, dispatched, etc.) in any technically feasible fashion. Any type of virtualized parallel runtime schedules the launched tasks onto the parallel processing elements, and the virtual processing elements execute the program on the parallel processing elements. Notably, in some embodiments, each virtual processing element can be associated with any amount of parallelism.

For instance, in some embodiments, each virtual processing element is a thread group, where each thread group can be a single thread, a single-dimensional array of threads, or a multi-dimensional block of threads. In the same or other embodiments, each task is a thread group instance of a kernel program. In some other embodiments, each task is an instruction sequence of a single thread scheduled on a processor core. In yet other embodiments, each task is an operating system image scheduled on a node.

As described previously herein in the context of multi-core processors and GEMMs, some conventional parallel decomposition strategies are tile-based. The output of a given MAC computation is partitioned into tiles based on a tile size, where each tile is a different discrete portion of the output. Each task is then configured to generate one or more complete tiles and therefore the indivisible unit of work is a tile. In general, conventional tile-based parallel decomposition strategies can suffer from system-wide underutilization due to quantization of whole tiles across parallel processing elements. For instance, in some embodiments, the computing system produces the tiles in waves and when the total number of tiles is not an integer multiple of the total number of parallel processing elements, the last wave of tile production does not occupy all the parallel processing elements.

By contrast, in the iteration-based parallel decomposition strategy for MAC computations, the indivisible unit of work is a MAC iteration, and the MAC iterations are distributed as equally as possible across the parallel processing elements. In some embodiments, for each output tile 442, if the MAC iterations associated with the output tile 442 are split between multiple parallel processing elements, then each of the parallel processing elements executes any number (including zero) and/or types of coordination operations (e.g., synchronization, communication, etc.) to generate the output tile 442.

In some other embodiments, for each output tile 442, if the MAC iterations associated with the output tile 442 are split between multiple virtual processing elements, then each of the virtual processing elements executes any number (including zero) and/or types of coordination operations (e.g., synchronization, communication, etc.) to generate the output tile 442 For instance, in the embodiment depicted in FIG. 5, the CTAs 390 are virtual processing elements that execute carry ins, carry outs, and the seam fixups 520(0)-520(2) to generate the output tiles 442(2), 442(4), and 442(6).

Any number and/or types of programs can implement the iteration-based parallel decomposition strategy in any technically feasible fashion. Furthermore, the programs can execute on the parallel processing elements, any number and/or types of other processing elements (e.g., the CPU 102), or any combination thereof. For instance, in some embodiments, a software application (e.g., the dispatch application 180) executes on a processing element that is external to the computing system that includes the parallel processing elements.

In some embodiments, the software application partitions the output of a given MAC computation into output tiles 442 based on the tile size 412 and sets the output tile count 452 equal to the total number of output tiles 442. The software application determines the MAC iterations per tile 454 based on the definition of a MAC iteration and the tile size 412. Subsequently, the software application sets the MAC iteration count 456 equal to the product of the output tile count 452 and the MAC iterations per tile 454.

The software application sets a task count equal to the maximum number of tasks that can execute concurrently across the parallel processing elements included in a given computing system. For a total of task count tasks, the software application configures each task such that the task is responsible for an equitable number of the MAC iterations, zero or more tile coordination operations, zero or more element-wise operations, and zero or more write operations to zero or more output tiles.

The software application then causes the tasks to be executed concurrently across the set of parallel processing elements in order to perform the MAC computation. The software application can cause the tasks to be executed concurrently across the set of parallel processing elements in any technically feasible fashion. In some embodiments, the software application schedules, via a virtualized parallel runtime or a non-virtualized parallel runtime, an equal share of the tasks onto each parallel processing element included in the set of parallel processing elements.

More specifically, in some embodiments, the tasks are associated with virtual processing elements, and the software application configures a virtualized parallel runtime to schedule an equal share of the tasks indirectly onto each of the parallel processing elements. For instance, in some embodiments, the software application launches a program associated with the MAC computation via a number of thread groups equal to the maximum number of tasks that can execute concurrently across the parallel processing elements. In some other embodiments, the software application configures a non-virtualized parallel runtime associated with the parallel computing system to schedule an equal share of the tasks directly onto each of the parallel processing elements. As scheduled by the parallel runtime, the tasks execute on the parallel processing elements to, collectively and concurrently, perform the MAC computation and store the results in the output tiles 442.

Advantageously, a MAC iteration can be defined such that the number of MAC operations included in each MAC iteration is significantly less than the number of MAC operations required to generate each of the output tiles 442. As a result, relative to conventional tile-based parallel decomposition techniques, any system-wide underutilization attributable to the quantization of MAC iterations across the parallel processing elements can be a smaller percentage of the execution time associated with a given MAC computation.

Figure 8:
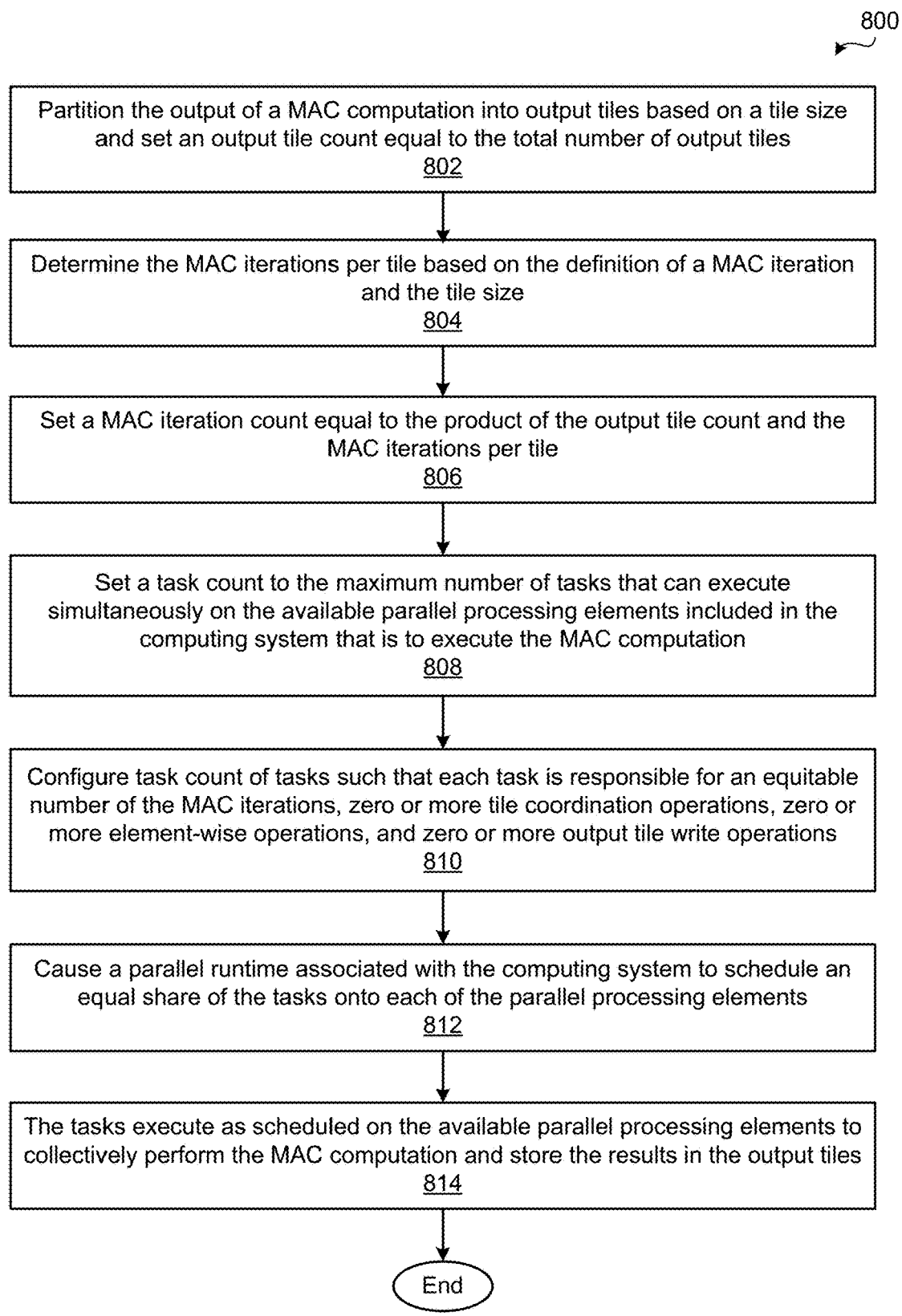
FIG. 8 is a flow diagram of method steps for performing a MAC computation on a computing system that includes multiple parallel processing elements, according to various other elements.

FIG. 8 is a flow diagram of method steps for performing a MAC computation on a computing system that includes multiple parallel processing elements, according to various embodiments. Although the method steps are described in the context of the systems of FIGS. 1-6, persons skilled in the art will understand that any system configured to implement the method steps, in any order, falls within the scope of the present invention. In that regard, the functionality described below may be distributed across any number and/or types of programs that execute on any number and/or types of parallel processing elements in any technically feasible fashion.

As shown, a method 800 begins at step 802, where a software application partitions the output of a MAC computation into output tiles 442 based on the tile size 412 and sets the output tile count 452 equal to the total number of output tiles 442. At step 804, the software application determines the MAC iterations per tile 454 based on the definition of a MAC iteration and the tile size 412. At step 806, the software application sets the MAC iteration count 456 equal to the product of the output tile count 452 and the MAC iterations per tile 454.

At step 808, the software application sets a task count equal to the maximum number of tasks that can execute simultaneously on the parallel processing elements. At step 810, the software application configures a total of task count tasks, such that each task is responsible for an equitable number of the MAC iterations, zero or more tile coordination operations, zero or more element-wise operations, and zero or more write operations to zero or more output tiles.

At step 812, the software application causes a parallel runtime associated with the computing system to schedule an equal share of the tasks onto each of the parallel processing elements. At step 814, the tasks execute as scheduled on the parallel processing elements to collectively perform the MAC computation and store the results in the output tiles 442. The method 800 then terminates.

In sum, the disclosed techniques can be used to divide the work associated with a MAC computation equitably across parallel processing elements included in a computing system. In general, using the disclosed techniques, each of the parallel processing elements is configured to execute an equitable share of the MAC iterations required to perform the MAC computation, zero or more tile coordination operations, and zero or more element-wise operations to generate zero or more output tiles.

In some embodiments, the MAC computation is a GEMM, the MAC operations are associated with a plus-multiply semiring, the computing system is a multi-core processor, and the parallel processing elements are processor cores. To compute the GEMM, a dispatch application partitions the output matrix into output tiles based on a tile size. The dispatch application sets a MAC iteration count equal to the product of the total number of output tiles and the MAC iterations per tile. The dispatch application sets a grid size of a grid of thread groups equal to the maximum wave size associated with the multi-core processor. Subsequently, the dispatch application launches a GEMM kernel with an execution configuration specifying the dimensions of the grid and each thread group and arguments specifying at least the MAC iteration count, the input and output matrices, and the layout of the input and output matrices.

Each thread group determines an associated equitable share of the MAC iterations based on a thread group identifier, the MAC iteration count, and the dimensions of the grid and executes the associated MAC iterations. Each thread group can compute a non-initial proper subset of at most one output tile, an initial proper subset of at most one output file, and zero or more entire output tiles. If a given thread group computes a non-initial proper subset of a given output tile, then the thread group performs carry-out operation(s) to store partial sums in a memory that is accessible to all thread groups in the grid.

If a given thread group computes an initial proper subset of a given output tile, then the thread group adds one or more sets of partial sums associated with the output tile and stored in the memory to a set of partial sums associated with the initial proper subset to generate elements of a matrix product associated with the output tile. If a given thread group compute an initial proper subset of a given output tile or the entire output tile, then the thread group also performs any number and/or types of operations to generate the output tile based on the elements of the matrix product associated with the output tile.

At least one technical advantage of the disclosed techniques relative to the prior art is that, with the disclosed techniques, the utilization rates of a computing system including multiple parallel processing elements can be increased when performing MAC computations. In that regard, with the disclosed techniques, the variation between the number of iterations executed by each parallel processing element when performing a MAC computation is limited to about one, and the time required to perform a given iteration can be substantially less than the time required to compute an given output tile using prior art approaches. Accordingly, the disclosed techniques can reduce the amount of parallel processing element idle time when performing MAC computations and increase computational throughput as well. In addition, in the context of multi-core processors, for each combination of MAC computation characteristics, a single MAC computation program can be implemented to more evenly distribute iterations across the different processing cores within a multi-core processor, irrespective of the tile size. Thus, the total number of MAC computation programs and the aggregate amount of resources required to generate, store, and transmit those programs can be reduced relative to prior art approaches. Further, because each MAC computation program can implement a tile size that is optimized for a given multi-core processor without negatively impacting the distribution of MAC computations across the processing cores, degradations in the computational throughput and latencies resulting from suboptimal tile size selection can be reduced. These technical advantages provide one or more technological improvements over prior art approaches.

1. In some embodiments, a computer-implemented method for performing multiply-accumulate ("MAC") computations comprises determining a first quantity of iterations associated with a first MAC computation, determining a maximum number of tasks that can execute concurrently across a plurality of parallel processing elements, and causing the maximum number of tasks to be executed concurrently across the plurality of parallel processing elements in order to perform the first MAC computation, wherein, during execution, each task performs a substantially similar number of the first quantity of iterations.

2. The computer-implemented method of clause 1, wherein the first MAC computation comprises a general matrix multiplication operation, a convolution operation, a tensor product operation, or a tensor contraction operation.

3. The computer-implemented method of clauses 1 or 2, wherein each iteration included in the first quantity of iterations is associated with a substantially similar amount of progress a given parallel processing element advances in a given accumulation dimension.

4. The computer-implemented method of any of clauses 1-3, wherein each iteration included in the first quantity of iterations is associated with a given number of MAC operations, wherein each MAC operation included in the given number of MAC operations corresponds to a plus-multiply semiring, a min-plus semiring, a max-multiply semiring, a min-max semiring, or an or-and semiring.

5. The computer-implemented method of any of clauses 1-4, wherein causing the maximum number of tasks to be executed concurrently across the plurality of parallel processing elements comprises launching a program associated with the first MAC computation via a number of thread groups equal to the maximum number of tasks, and wherein each thread group comprises one or more threads.

6. The computer-implemented method of any of clauses 1-5, wherein determining the first quantity of iterations comprises partitioning an output of the first MAC computation into a second quantity of output tiles, determining that each output tile included in the second quantity of output tiles is associated with a third quantity of iterations, and setting the first quantity of iterations equal to a product of the second quantity of output tiles and the third quantity of iterations.

7. The computer-implemented method of any of clauses 1-6, wherein one or more iterations associated with a first output tile output for the first MAC computation partially overlap with one or more iterations associated with a first task and one or more iterations associated with a second task.

8. The computer-implemented method of any of clauses 1-7, wherein an output of the first MAC computation comprises at least a first output tile and a second output tile, and wherein a first plurality of iterations associated with a first task includes one or more iterations associated with the first output tile and one or more iterations associated with the second output tile.

9. The computer-implemented method of any of clauses 1-8, wherein during execution, a first task performs one or more iterations to compute a first set of partial sums associated with a matrix product, performs one or more carry-in operations on a second set of partial sums associated with the matrix product, and generates a first output tile for the first MAC computation based on the first set of partial sums and the second set of partial sums.

10. The computer-implemented method of any of clauses 1-9, wherein the plurality of parallel processing elements comprises a plurality of parallel logic units included in a processor core, a plurality of processor cores included in a multi-core processor, a plurality of parallel processors included in a computer node, or a plurality of parallel computer nodes included in a distributed computer system.

11. In some embodiments, one or more non-transitory computer readable media include instructions that, when executed by one or more processors, cause the one or more processors to perform multiply-accumulate ("MAC") computations by performing the steps of determining a first quantity of iterations associated with a first MAC computation, determining a maximum number of tasks that can execute concurrently across a plurality of parallel processing elements, and causing the maximum number of tasks to be executed concurrently across the plurality of parallel processing elements in order to perform the first MAC computation, wherein, during execution, each task performs a substantially similar number of the first quantity of iterations.

12. The one or more non-transitory computer readable media of clause 11, wherein the first MAC computation comprises a general matrix multiplication operation, a convolution operation, a tensor product operation, or a tensor contraction operation.

13. The one or more non-transitory computer readable media of clauses 11 or 12, wherein each iteration included in the first quantity of iterations is associated with a single MAC processor instruction, a bulk MAC processor instruction, a static unrolling of one or more MAC processor instructions, or a static unrolling of one or more bulk MAC processor instructions.

14. The one or more non-transitory computer readable media of any of clauses 11-13, wherein each iteration included in the first quantity of iterations is associated with a given number of MAC operations, wherein each MAC operation included in the given number of MAC operations corresponds to a plus-multiply semiring, a min-plus semiring, a max-multiply semiring, a min-max semiring, or an or-and semiring.

15. The one or more non-transitory computer readable media of any of clauses 11-14, wherein causing the maximum number of tasks to be executed concurrently across the plurality of parallel processing elements comprises scheduling an equal portion of the tasks comprising the maximum number of tasks onto each parallel processing element included in the plurality of parallel processing elements.

16. The one or more non-transitory computer readable media of any of clauses 11-15, wherein determining the first quantity of iterations comprises partitioning an output of the first MAC computation into a second quantity of output tiles, determining that each output tile included in the second quantity of output tiles is associated with a third quantity of iterations, and setting the first quantity of iterations equal to a product of the second quantity of output tiles and the third quantity of iterations.

17. The one or more non-transitory computer readable media of any of clauses 11-16, wherein one or more iterations associated with a first output tile output for the first MAC computation partially overlap with one or more iterations associated with a first task and one or more iterations associated with a second task.

18. The one or more non-transitory computer readable media of any of clauses 11-17, wherein during execution, a first task performs one or more iterations to compute a first set of partial sums associated with a matrix product and performs one or more carry-out operations on the first set of partial sums to enable a second task to generate a first output tile for the first MAC computation.

19. The one or more non-transitory computer readable media of any of clauses 11-18, wherein the plurality of parallel processing elements comprises a plurality of parallel logic units included in a processor core, a plurality of processor cores included in a multi-core processor, a plurality of parallel processors included in a computer node, or a plurality of parallel computer nodes included in a distributed computer system.

20. In some embodiments, a system comprises one or more memories storing instructions and one or more processors coupled to the one or more memories that, when executing the instructions, perform the steps of determining a first quantity of iterations associated with a MAC computation, determining a maximum number of tasks that can execute concurrently across a plurality of parallel processing elements, and causing the maximum number of tasks to be executed concurrently across the plurality of parallel processing elements in order to perform the MAC computation, wherein, during execution, each task performs a substantially similar number of the first quantity of iterations.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory, Flash memory, an optical fiber, a portable compact disc read-only memory, an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing multiply-accumulate ("MAC") computations, the method comprising:
   determining a first quantity of iterations associated with a first MAC computation;
   determining a maximum number of tasks that can execute concurrently across a plurality of parallel processing elements; and
   performing one or more operations to schedule the maximum number of tasks to be executed concurrently across the plurality of parallel processing elements in order to perform the first MAC computation,
   wherein, during execution of the maximum number of tasks, the first quantity of iterations is distributed as closely as evenly possible across the plurality of parallel processing elements.

2. The computer-implemented method of claim 1, wherein the first MAC computation comprises a general matrix multiplication operation, a convolution operation, a tensor product operation, or a tensor contraction operation.

3. The computer-implemented method of claim 1, wherein each iteration included in the first quantity of iterations is associated with an amount of progress a given parallel processing element advances in a given accumulation dimension.

4. The computer-implemented method of claim 1, wherein each iteration included in the first quantity of iterations is associated with a given number of MAC operations, wherein each MAC operation included in the given number of MAC operations corresponds to a plus-multiply semiring, a min-plus semiring, a max-multiply semiring, a min-max semiring, or an or-and semiring.

5. The computer-implemented method of claim 1, wherein performing the one or more operations to schedule the maximum number of tasks to be executed concurrently across the plurality of parallel processing elements comprises launching a program associated with the first MAC computation via a number of thread groups equal to the maximum number of tasks, and wherein each thread group comprises one or more threads.

6. The computer-implemented method of claim 1, wherein determining the first quantity of iterations comprises:
   partitioning an output of the first MAC computation into a second quantity of output tiles;
   determining that each output tile included in the second quantity of output tiles is associated with a third quantity of iterations; and
   setting the first quantity of iterations equal to a product of the second quantity of output tiles and the third quantity of iterations.

7. The computer-implemented method of claim 1, wherein one or more iterations associated with a first output tile output for the first MAC computation partially overlap with one or more iterations associated with a first task and one or more iterations associated with a second task.

8. The computer-implemented method of claim 1, wherein an output of the first MAC computation comprises at least a first output tile and a second output tile, and wherein a first plurality of iterations associated with a first task includes one or more iterations associated with the first output tile and one or more iterations associated with the second output tile.

9. The computer-implemented method of claim 1, wherein during execution of the maximum number of tasks, a first task performs one or more iterations to compute a first set of partial sums associated with a matrix product, performs one or more carry-in operations on a second set of partial sums associated with the matrix product, and generates a first output tile for the first MAC computation based on the first set of partial sums and the second set of partial sums.

10. The computer-implemented method of claim 1, wherein the plurality of parallel processing elements comprises a plurality of parallel logic units included in a processor core, a plurality of processor cores included in a multi-core processor, a plurality of parallel processors included in a computer node, or a plurality of parallel computer nodes included in a distributed computer system.

11. One or more non-transitory computer-readable media including instructions that, when executed by one or more processors, cause the one or more processors to perform multiply-accumulate ("MAC") computations by performing the steps of:
   determining a first quantity of iterations associated with a first MAC computation;
   determining a maximum number of tasks that can execute concurrently across a plurality of parallel processing elements; and
   performing one or more operations to schedule the maximum number of tasks to be executed concurrently across the plurality of parallel processing elements in order to perform the first MAC computation,
   wherein, during execution of the maximum number of tasks, the first quantity of iterations is distributed as closely as evenly possible across the plurality of parallel processing elements.

12. The one or more non-transitory computer-readable media of claim 11, wherein the first MAC computation comprises a general matrix multiplication operation, a convolution operation, a tensor product operation, or a tensor contraction operation.

13. The one or more non-transitory computer-readable media of claim 11, wherein each iteration included in the first quantity of iterations is associated with a single MAC processor instruction, a bulk MAC processor instruction, a static unrolling of one or more MAC processor instructions, or a static unrolling of one or more bulk MAC processor instructions.

14. The one or more non-transitory computer-readable media of claim 11, wherein each iteration included in the first quantity of iterations is associated with a given number of MAC operations, wherein each MAC operation included in the given number of MAC operations corresponds to a plus-multiply semiring, a min-plus semiring, a max-multiply semiring, a min-max semiring, or an or-and semiring.

15. The one or more non-transitory computer-readable media of claim 11, wherein performing the one or more operations to schedule the maximum number of tasks to be executed concurrently across the plurality of parallel processing elements comprises scheduling an equal portion of the tasks comprising the maximum number of tasks onto each parallel processing element included in the plurality of parallel processing elements.

16. The one or more non-transitory computer-readable media of claim 11, wherein determining the first quantity of iterations comprises:
   partitioning an output of the first MAC computation into a second quantity of output tiles;
   determining that each output tile included in the second quantity of output tiles is associated with a third quantity of iterations; and
   setting the first quantity of iterations equal to a product of the second quantity of output tiles and the third quantity of iterations.

17. The one or more non-transitory computer-readable media of claim 11, wherein one or more iterations associated with a first output tile output for the first MAC computation partially overlap with one or more iterations associated with a first task and one or more iterations associated with a second task.

18. The one or more non-transitory computer-readable media of claim 11, wherein during execution of the maximum number of tasks, a first task performs one or more iterations to compute a first set of partial sums associated with a matrix product and performs one or more carry-out operations on the first set of partial sums to enable a second task to generate a first output tile for the first MAC computation.

19. The one or more non-transitory computer-readable media of claim 11, wherein the plurality of parallel processing elements comprises a plurality of parallel logic units included in a processor core, a plurality of processor cores included in a multi-core processor, a plurality of parallel processors included in a computer node, or a plurality of parallel computer nodes included in a distributed computer system.

20. A system comprising:
   one or more memories storing instructions; and
   one or more processors coupled to the one or more memories that, when executing the instructions, perform the steps of:
      determining a first quantity of iterations associated with a MAC computation;
      determining a maximum number of tasks that can execute concurrently across a plurality of parallel processing elements; and
      performing one or more operations to schedule the maximum number of tasks to be executed concurrently across the plurality of parallel processing elements in order to perform the MAC computation,
      wherein, during execution of the maximum number of tasks, the first quantity of iterations is distributed as closely as evenly possible across the plurality of parallel processing elements.

21. The computer-implemented method of claim 1, wherein, during execution of the maximum number of tasks, a difference in a number of iterations performed between any two parallel processing elements included in the plurality of parallel processing elements is at most one.

* * * * *